United States Patent [19]

Endo

[11] Patent Number: 4,477,184

[45] Date of Patent: Oct. 16, 1984

[54] OBSTACLE DETECTION SYSTEM FOR USE IN VEHICLES

[75] Inventor: Hiroshi Endo, Yokosuka, Japan

[73] Assignee: Nissan Motor Company, Limited, Yokohama, Japan

[21] Appl. No.: 113,263

[22] Filed: Jan. 18, 1980

[30] Foreign Application Priority Data

Jan. 19, 1979 [JP] Japan ................................... 54-3928

[51] Int. Cl.$^3$ ........................ G01B 11/26; G01C 3/08; G01P 3/36
[52] U.S. Cl. .................................. 356/141; 180/169; 350/358; 356/5; 356/28; 358/201
[58] Field of Search ...................... 356/1, 4, 5, 28, 141, 356/152; 180/167, 169; 434/21, 22, 27; 350/358; 358/201, 63

[56] References Cited

U.S. PATENT DOCUMENTS

| | | | |
|---|---|---|---|
| 3,443,870 | 5/1969 | Morgan et al. | 356/5 |
| 3,661,459 | 5/1972 | Aoki | 356/5 |
| 3,781,111 | 12/1973 | Fletcher et al. | 356/152 |
| 3,809,477 | 5/1974 | Russell | 356/152 |
| 4,025,193 | 5/1977 | Pond et al. | 356/152 |
| 4,107,701 | 8/1978 | Sprague et al. | 358/201 |
| 4,180,322 | 12/1979 | Farcinade | 356/1 |

FOREIGN PATENT DOCUMENTS

| | | | |
|---|---|---|---|
| WO79/00189 | 4/1979 | PCT Int'l Appl. | 356/1 |
| 1528691 | 10/1978 | United Kingdom | 356/152 |

Primary Examiner—S. C. Buczinski
Attorney, Agent, or Firm—Lowe, King, Price and Becker

[57] ABSTRACT

An obstacle detection system for vehicles comprises a laser radar mounted on the front end of a vehicle and modulated by drive pulses of high rate. The laser pulses are deflected in two orthogonal directions by paired deflection signals fed from a deflection driver to paired acousto-optic light deflectors to digitally scan a space ahead of the running vehicle. The deflector driver supplies paired deflection information to arithmetic logic means. One deflection signal fed to one deflector has a rate much higher than the other and is synchronized therewith. When receiving a return pulse by a photo-detector, a video pulse of substantially constant level is reproduced by a sensitivity time control function. The distance between a target and the vehicle can be registered in a binary counter. Relevant distance information is supplied to the arithmetic logic means. The latter provides a decision of whether a possibility of collision exists and produces an alarm when the distance approaches a stopping distance. For two facing targets the arithmetic logic means calculates a spacing between them and provides decision that passing-through therebetween is impossible if the spacing is smaller than a predetermined width. For a target above the road the arithmetic logic means calculates its height and provides a decision that passing-through thereunder is impossible if that height is smaller than a predetermined height.

48 Claims, 39 Drawing Figures

OBSTACLE DETECTION SYSTEM FOR USE IN VEHICLES

BACKGROUND OF THE INVENTION

1. Field of the Invention

The present invention relates to a detection system of obstacles for use in vehicles, wherein various information data concerning each target existing on a course to be traveled by the vehicle, such as size or dimension of each target, a direction of each target to the vehicle, a distance between the vehicle and each target, mutual distance of targets facing each other, and a height of each target lying over the vehicular course, are detected by using a laser light, and from said information as detected decisions are enabled as to possibilities of accidents such as collision, contacts, etc. of the vehicle with each of the targets on the course.

Upon driving the vehicle it is necessary for a driver to make decisions of various possibilities; such as the possibility of collision with targets which may be, for example, preceding vehicles located ahead of the vehicle; the possibility of passing-through a space between vehicles parked or stopped along side portions of the road, etc; the possibility of passing-through under targets located above the vehicle such as arcades, overbridges for pedestrian, and the like.

The decisions described above may be realized to some extent by a driver having extensive driving experience. However, such personal decisions are insufficient for the purposes of complete safety in the driving operation. Thus, it is required to provide the driver with auxiliary means through which he can make properly said decisions so that driving safety is ensured, contributing to substantial reduction of accidents by vehicles such as automobiles.

2. Description of the Prior Art

The various decisions recited above have previously been effected by an eye measurement of the driver. Such decisions however, are insufficient.

Heretofore, systems for decision as to possibility of collision with targets ahead of the vehicle have been proposed, wherein a radio radar is mounted on the vehicle and the distance to the targets from the vehicle and/or the relative speed of the targets to the vehicle are detected. However, in the radio radar even a minimum spread angle of the radio beam amounts to the order of about 1° (17 m radians) by limitation in size of the antenna which can be mounted on the vehicle, so that the spot size of the radio beam is caused to spread to a diameter in the order of 85 cm at a location which is 50 m distant from the front portion of the vehicle. Therefore, the known systems present problems in that accurate measurement of the distance and relation in position between the target and the vehicle is difficult; that targets which exist alongside the road and do not form any obstacle, such as guardrails, may be detected erroneously as obstacles; and that any detection systems of obstacles which require very high precision, such as those making the decision as to said possibilities of collision and passing-through cannot be realized.

Moreover, the known detection system using the radio radar has disadvantages that erroneous operation is liable to occur at curved portions of the rod, whereas the known detection system which is provided with a mirror as deflection means of a laser beam cannot achieve precise control of deflection angles for scanning the laser beam.

In addition, the known detection system cannot provide the needed decisions quickly and accurately.

SUMMARY OF THE INVENTION

An object of the present invention is to provide an obstacle detection system for use in vehicles, wherein a laser radar is used in a manner such that a space or course ahead of the vehicle and to be traveled thereby is scanned at very high rate in a two-dimensional pattern by a laser light modulated in pulse mode, so that various informational data such as positions of each target relative to the vehicle, distances between each target and the vehicle, heights of relevant targets above the road, etc., can be detected rapidly and accurately by a reflected laser light from each target, thereby enabling the provision of decisions as to the possibility of collision, the possibility of passing-through in the width direction of the vehicle and the possibility of passing-through in the height direction of the vehicle, and greatly reducing accidents caused by collision, contacts, etc. of vehicles which originate from erroneous operation and/or misjudgement of the driver himself.

A further object of the invention is to provide an obstacle detection system wherein a laser beam, which is much sharper than a radio beam from known radio radar, is used to scan the space ahead of the vehicle at very high density in order to enable measurement of much higher precision than that by the radio radar.

Another object of the invention is to provide an obstacle detection system, wherein both size and direction of the target can be detected so that erroneous operation of the radar can be substantially eliminated at curved portions of the road where the known radio radar is liable to operate in an erroneous manner.

Still a further object of the invention is to provide an obstacle detection system, wherein the laser beam is deflected by means of ultrasonic deflectors so that the laser beam can be controlled with high precision in its deflection angle, and thus, the direction of the reflection point on the target can be measured with high accuracy in respect of the vehicle.

Still another object of the invention is to provide an obstacle detection system, wherein at the receive portion of the laser radar an STC (Sensitivity Time Control) is effected so that the level of an electric signal derived by photo-electric conversion of the reflected light from the target is determined only by a reflection factor of the target irrespective of the distance from the vehicle to the target, thereby enabling removal of spurious reflection from the road, etc. and prevention of erroneous operation of the laser radar.

A further object of the invention is to provide an obstacle detection system, wherein information of direction and distance of a reflection point of a target measured by the laser light is processed by means of a microcomputer so that a decision as to possibility of collision and/or passing-through can be provided with high precision and within a very short period of time.

In accordance with the present invention an obstacle detection system for use in vehicles, wherein decisions based upon predetermined criteria are made with respect to one or more targets existing on a course to be traveled by the vehicle to determine whether each said target constitutes an obstacle, comprises; control clock means for generating central clock pulses of very high rate; pulse driver means responsive to said clock means for producing a sequence of drive pulses; laser means responsive to said pulse drive means for emitting a sequence of laser pulses; light deflector means responsive to said clock means and said laser means for sequentially deflecting said each laser pulse into a two-dimensional scanning pattern in the running direction of the vehicle and also producing a pair of signals conveying information of deflection corresponding to a direction of each said laser pulse as deflected; transducer means responsive to each return laser pulse reflected from the one or more targets for photo-electrically converting each said return laser pulse into an electric pulse signal; distance information means responsive to said transducer means for producing information of distance to each said target; and arithmetic logic means responsive to said deflection information pair of signals and to said distance information corresponding thereto for deriving a direction and a distance of each said target with respect to a point where the laser pulse is transmitted, and further responsive to said direction and distance as derived to and a signal indicative of the speed of the vehicle for providing at least one of the decisions as to a possibility of collision of the vehicle with the target, a possibility of passing-through in the width direction of the vehicle and a possibility of passing through in height direction of the vehicle.

Moreover, in the detection system according to the invention, said arithmetic logic means provides decision a that there exists a possibility of collision with a target and produces an alarm signal when a distance $R_T$ between said target and the vehicle approaches a stopping distance $R_s$ which is sum of a free running distance $R_1$ and a braking distance $R_2$ which are dependent upon the speed of the vehicle, respectively.

In the decision system of the invention, said arithmetic logic means provides a decision that passing-through between at least two targets in the direction of width of the vehicle is not possible and produces an alarm signal if the following relation holds:

$$W + \delta_w \geq R_l \theta_{xl} + R_r \theta_{xr}$$

where W is an overall width of the vehicle; $\delta_w$ is a predetermined margin in width; $R_l$ is a distance between said laser pulse transmitting point on the central axis of the vehicle and an extreme right end of a leftside target to said central axis, from which right end a return laser pulse can be received; $\theta_{xl}$ is an angle between said central axis and said extreme right end of said leftside target to said laser pulse transmitting point; $R_r$ is a distance between said laser pulse transmitting point and an extreme left end of a rightside target to said central axis, from which left end a return laser pulse can be received; and $\theta_{xr}$ is an angle between said central axis and said extreme left end of said rightside target to said laser pulse transmitting point.

On the other hand, according to the detection system of the invention said arithmetic logic means provides a decision that passing-through between targets in the direction of width of the vehicle is not possible and produces an alarm signal if either of the following relations holds:

$$\overline{d_{ln}} \leq \frac{W}{2} + \Delta v$$

and $$\overline{d_{rn}} \leq \frac{W}{2} + \Delta v$$

where $\overline{d_{ln}}$ is an averaged minimum distance between a leftside target and the central axis of the vehicle, $\overline{d_{rn}}$ is an averaged minimum distance between a rightside target and said central axis, W is an overall width of the vehicle, and $\Delta v$ is a predetermined half margin in width.

Further, in accordance with the detection system of the invention said arithmetic logic means provides a decision that passing-through in the direction of height of the vehicle is not possible and produces an alarm signal if the following relation holds:

$$h_t + \delta_h \geq R \cdot \theta_y$$

where $h_t$ is a height between said laser pulse transmitting point and a plane involving the top of the vehicle; $\delta_h$ is a predetermined margin of height in the upward direction; R is a distance between said laser pulse transmitting point and a lower end of an upper target located above the vehicular course, from which end a return laser pulse can be received; and $\theta_y$ is an angle between said central axis and said lower end of said upper target to said laser pulse transmitting point.

In addition, according to the detection system of the invention said arithmetic logic means also provides a decision that passing-through in the direction of height of the vehicle is not possible and produces an alarm signal if the following relation is satisfied:

$$h_u + \delta_g \geq |R \cdot \theta_y|$$

where $h_u$ is a height which is equal to subtraction of the ground clearance of the vehicle from the height of said laser pulse transmitting point; $\delta_g$ is a predetermined margin of height between the bottom of the vehicle and the road surface; R is a distance between said laser pulse transmitting point and an upper end of a lower target placed on the vehicular course, from which end a return laser pulse can be received; and $\theta_y$ is an angle between said central axis and said upper end of said lower target to said laser pulse transmitting point.

DESCRIPTION OF THE PREFERRED EMBODIMENT

Figure 1:
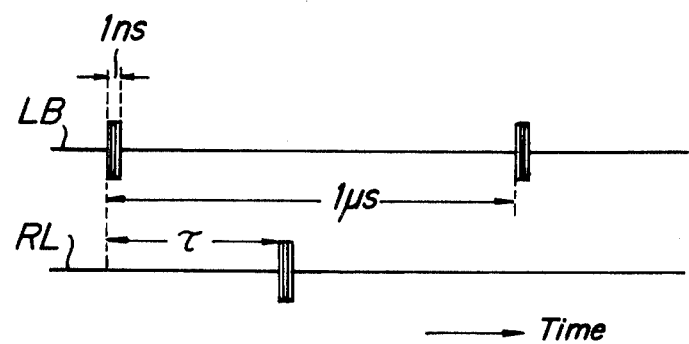
FIG. 1 is a timing chart for a laser pulse and its return pulse.
Figure 2:
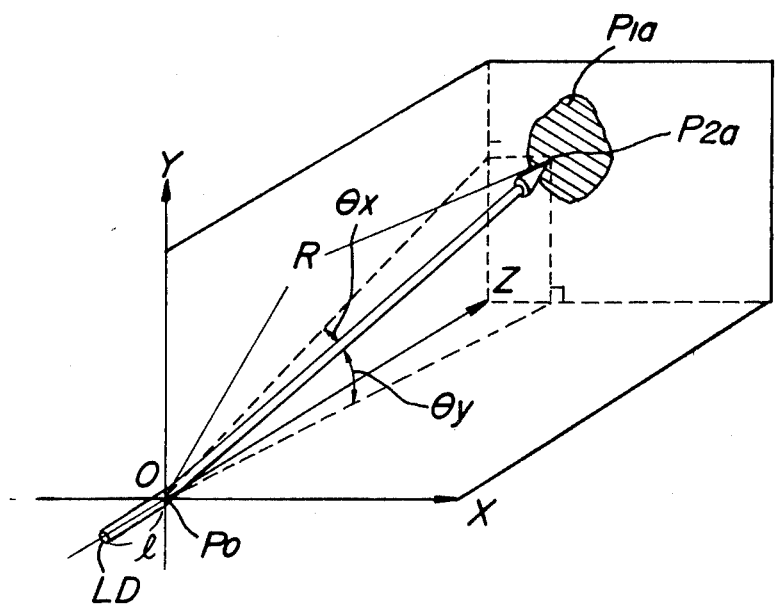
FIG. 2 is a perspective view showing a scanning manner of a laser beam.

According to the invention a laser radar is mounted on a front portion of a vehicle, and it emits forwardly a laser beam LB which is subject to, for example, pulse modulation in a manner such that a modulated pulse of the laser beam has a pulse width in the order of 1 ns and a pulse repetition period in the order of 1 $\mu$s as shown in FIG. 1. A return laser pulse RL reflected from a target is detected as shown in FIG. 1, and a distance R from the vehicle to the target is calculated on the basis of the formula: $R=(\frac{1}{2})c\tau$ (c is the velocity of light) from a propagation delay time of $\tau$ as measured for the return pulse. In another way as shown in FIG. 2, the laser beam LB is deflected in a two-dimensional pattern with a high scanning rate so as to scan a space ahead of the vehicle, and information $\theta_x$ and $\theta_y$ relating to a size and a direction of a target is detected from a direction of a reflecting point with respect to the vehicle. In FIG. 2, a symbol "LD" designates a laser diode (a light source), $P_o$ a point of deflection (a transmitting point), $P_{1a}$ a target and $P_{2a}$ a reflecting point thereon, respectively. In addition, a Z-axis passing through the laser diode LD and the deflection point $P_o$ coincides with a center axis of the vehicle in the direction of its forward running, and a distance 1 between the light source LD and the deflection point $P_o$ is smaller than or equal to 10 cm, and thus, is very small with respect to the distance R up to the target.

A decision as to the possibility of whether the vehicle can pass through between targets placed on a road surface ahead of the vehicle, which is also referred to as a decision of the possibility of passing through in the direction of width of the vehicle, will be explained by referring to FIG. 3.

Figure 3:
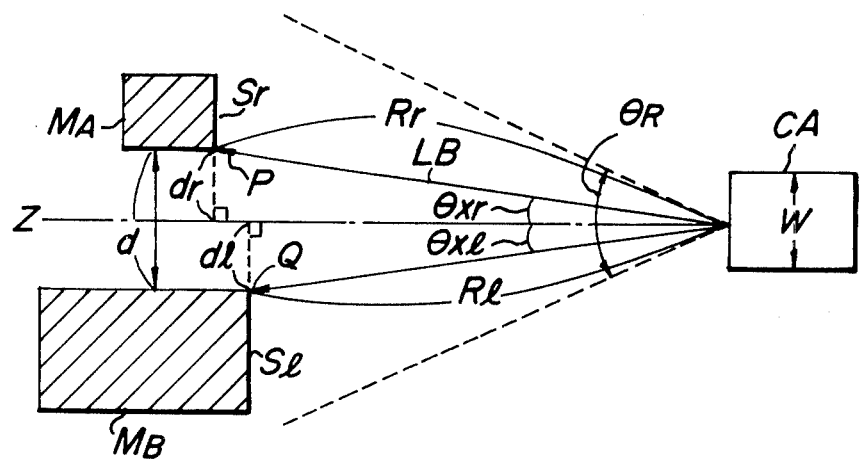
FIG. 3 is a plan view showing how to detect obstacles in the direction of width of a vehicle according to the invention.

As shown in FIG. 3, when an edge of a reflection face $S_r$ of a first target $M_A$ facing the Z-axis is represented by a point P and an edge of a reflection face $S_l$ of a second target $M_B$ facing the Z-axis is designated by a point Q, a distance $d_r$ from the point P to the Z-axis may be given by:

$$D_r = R_r \sin\theta_{xr} \approx R_r \theta_{xr} \quad (1)$$

because $\theta_{xr} << 1$ rad. and a distance $d_l$ from the Q point to the Z-axis may be written as:

$$d_l = R_l \sin\theta_{xl} \approx R_l \theta_{xl} \quad (2)$$

due to $\theta_{xl} << 1$ rad. Subsequently, the width W of the vehicle CA is compared with a combined distance $d = d_r + d_l$, and passing-through by the vehicle is decided to be impossible if the following relation is met:

$$W + \delta_W \geq d_r + d_l = R_r\theta_{xr} + R_l\theta_{xl} \quad (3)$$

where $\delta_W$ is a margin of width for the vehicle, for example, in the order of 10 cm. In FIG. 3 $\theta_R$ represents a scanning range of the laser beam LB, for example, in the order of $\pm 10°$ to the Z-axis.

Figure 4:
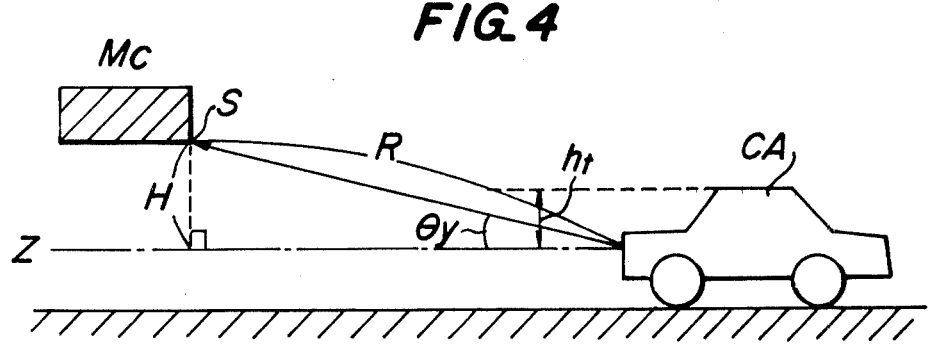
FIG. 4 is a side view illustrating how to detect an obstacle in the direction of height of the vehicle according to the invention.

Moreover, a decision as to the possibility by whether the vehicle can pass through under one or more targets above the road surface, which is also referred to as a decision of the possibility of passing through in the direction of height of the vehicle, is effected as shown in FIG. 4. In the figure an angular direction $\theta_y$ of a target $M_c$ existing, upwards the road surface, and a distance R to the target from the vehicle CA are detected, and then the question of whether or not the target Mc forms an overhead obstacle to the vehicle is decided from the following equation:

$$h_t + \delta_h \geq H \simeq R \cdot \theta_y \quad (4)$$

where $h_t$ is a height from the Z-axis to the top of the vehicle and $\delta_h$ is a margin of height, for example, in the order of 30 cm. Accordingly, if inequality (4) is satisfied, the target Mc constitutes an obstacle.

In addition, a decision as to the possibility of whether the vehicle will crash with targets ahead of the vehicle will be explained by referring to FIG. 5.

Figure 5:
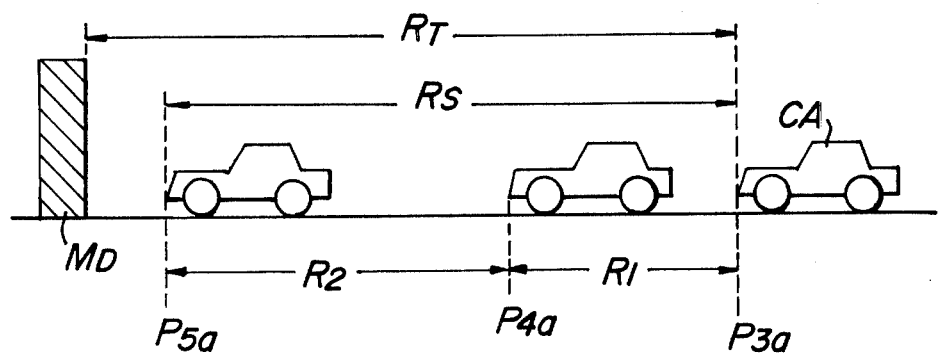
FIG. 5 is a side view showing how to prevent collision of the vehicle with an obstacle ahead thereof in accordance with the invention.

In FIG. 5, a symbol $R_s$ represents a stopping distance for which the vehicle CA needs to travel before its stopping after the driver recognizes a target $M_D$ and begins to operate the brake pedal. If the vehicle approaches the target within the stopping distance $R_s$, it is impossible to avoid a crash with that target. In FIG. 5, a symbol $P_{3a}$ shows a point where the target $M_D$ is recognized by the driver, $P_{4a}$ a point where the driver begins to operate the brake pedal and $P_{5a}$ a point where the vehicle is stopped. The distance from $P_{3a}$ to $P_{4a}$ is the free running distance $R_1$ and the distance from $P_{4a}$ to $P_{5a}$ is the braking distance $R_2$.

Therefore, said stopping distance $R_s$ is given by $R_s = R_1 + R_2$.

Said free running distance $R_1$ is expressed by $R_1 = v_a \cdot T_d$, where $v_a$ is the speed of the vehicle and $T_d$ is a delay time of braking operation by the driver (in the order of 1 sec.).

Said braking distance $R_2$ is given by $R_2 = \frac{1}{2} \alpha \cdot v_a^2$, where $\alpha$ is the deceleration of the vehicle.

Consequently, $R_s = \frac{1}{2} \alpha \cdot v_a^2 + v_a \cdot T_d$ is obtained.

Finally, when a distance $R_T$ from the vehicle CA to the target $M_D$ is smaller than or equal to a warning or precaution distance $R_Q$ which is sum of the stopping distance $R_s$ and a predetermined marginal distance $R_p$, that is, when the condition $$R_T \leq R_Q = \tfrac{1}{2} \alpha v_a^2 + v_a \cdot T_d + R_p$$

is met, an alarm is produced to inform the driver of possibility of crash.

Now, some of preferred embodiments of the invention will be explained with reference to their construction and functions along the following four main items in succession.

(1) BASIC CONSTRUCTION AND OPERATION OF AN OBSTACLE DETECTION SYSTEM FOR USE IN VEHICLES ACCORDING TO THE INVENTION.

(2) METHOD FOR DEFLECTING LASER BEAM IN OBSTACLE DETECTION SYSTEM ACCORDING TO THE INVENTION.

(3) PULSE MODULATION OF LASER LIGHT AND DETECTION OF REFLECTED LIGHT PULSE IN AN OBSTACLE DETECTION SYSTEM ACCORDING TO THE INVENTION.

(4) FUNCTIONS OF DECISION AS TO WHETHER TARGETS FORM ANY OBSTACLE.

(1) BASIC CONSTRUCTION AND OPERATION OF AN OBSTACLE DETECTION SYSTEM FOR USE IN VEHICLES ACCORDING TO THE INVENTION:

(A) Construction and Function of an Obstacle Detection System according to the Invention.

Figure 6:
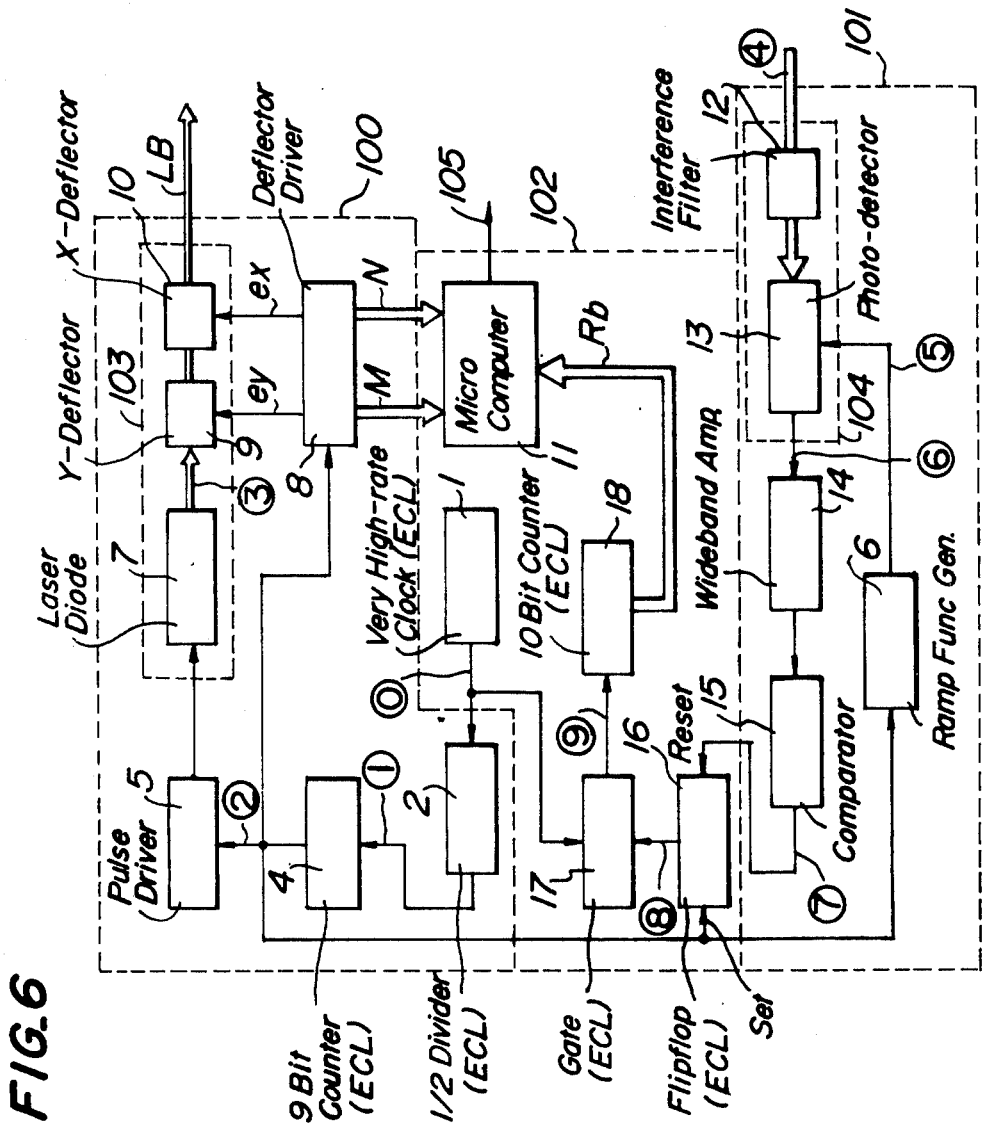
FIG. 6 is a block diagram of an embodiment of a detection system of obstacles according to the invention.
Figure 7:
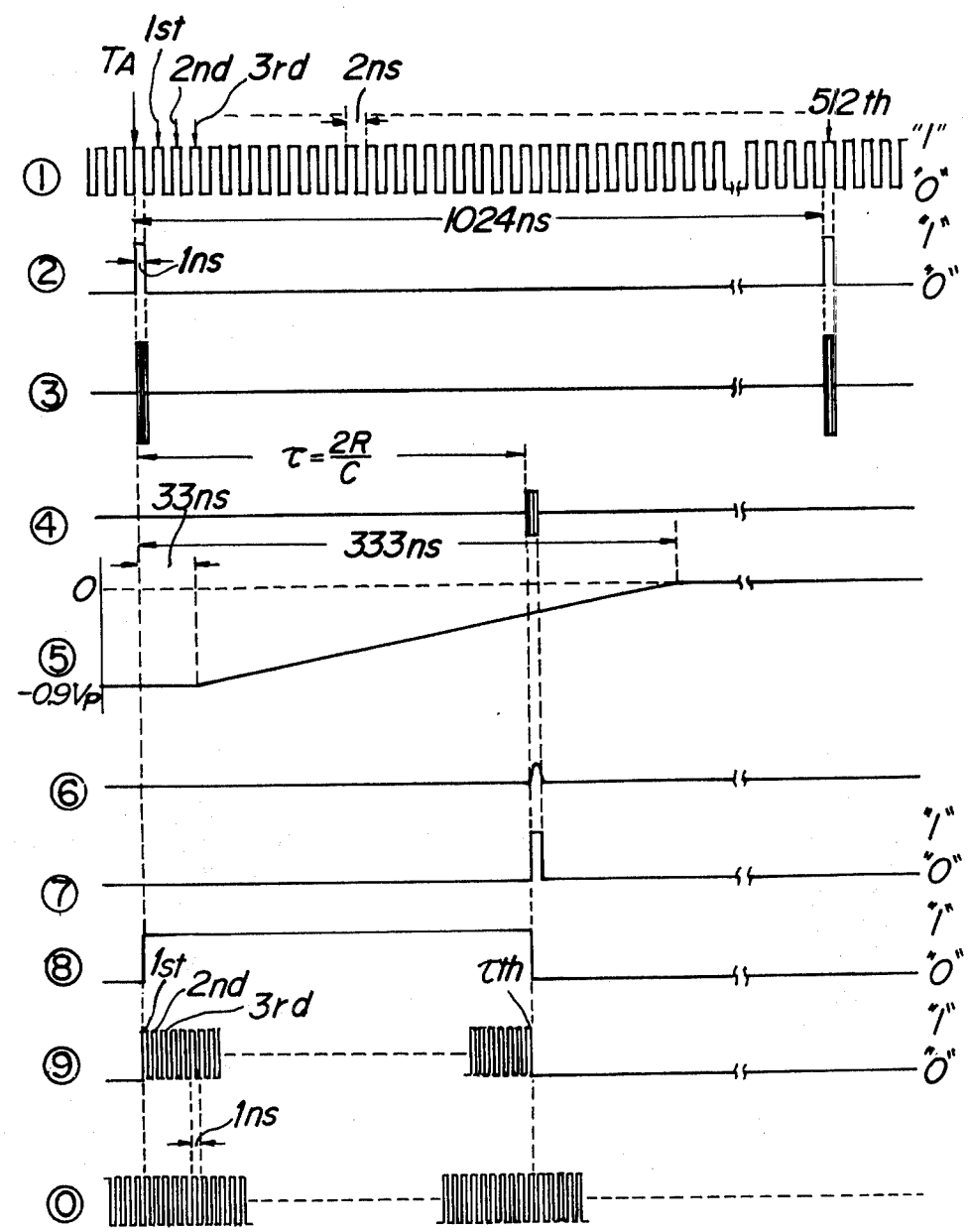
FIG. 7 is a timing chart for the relevant portions in FIG. 6.

A basic construction of one embodiment of a detection system for obstacles according to the invention is shown in FIG. 6 and a timing chart therefore is illustrated in FIG. 7. Various waveforms ⓪ – ⑨ in FIG. 7 correspond to signals appearing at various points ⓪ – ⑨ designated in FIG. 6, respectively.

(a) Transmit Portion 100

A clock generator of very high repetition rate 1 constituted by an emitter coupled logic (ECL) is adapted to generate a clock signal of very high repetition rate ⓪ having a frequency of 1 GHz (a period of 1 nsec.) and a duty factor of 50%, and said clock signal is applied to a divide-by-two divider 2 and a gate circuit 17 which consist of an emitter coupled logic (ECL), respectively. The clock signal ⓪ is divided by two at the divider 2 so that it provides a clock signal of still very high repetition rate ① having a frequency of 500 MHz (a period of 2 nsec) and a duty factor of 50%. The clock signal ① is applied to a nine-bit binary counter 4 formed by ECL, and the counter 4 produces a carry signal ② at every five hundred and twelfth input clock pulse of the clock signal ① . The carry signal ② has a period of 1024 nsec. (1.024 μsec.) and a pulse width of 1 nsec., and is supplied to a pulse driver of high repetition rate 5 and a ramp function generator 6, respectively. The high-rate pulse driver 5 which will be described in detail later is adapted to generate a drive signal which is used for pulse modulation of a laser diode 7 at high repetition rate, and the drive signal is fed to the laser diode 7 of an optical system for transmission 103 as shown in a block of a broken line. The drive signal causes a current flowing through the laser diode 7 to change into a pulse form so that the laser diode 7 produces a laser pulse ③ which is provided by modulating a laser light of a wavelength $\lambda = 0.85$ μm (8,500 Å) into a pulse form having a pulse width of 1 nsec. and a period of 1.024 μsec.

The carry signal ② is also applied to a deflector driver 8, from which deflector drive signals $e_y$ and $e_x$ are supplied to a Y-deflector 9 and an X-deflector 10, respectively, so that the laser pulse ③ is deflected at high-rate in a two-dimensional pattern in order to enable a laser beam LB to scan in a plane perpendicular to the travel direction of the vehicle (Details of the deflectors and the deflector driver will be described later). It should be noted that from the deflector driver 8 to a microcomputer 11 are applied both of information of a Y-axis deflection M and information of an X-axis deflection N in the form of eight-bit parallel binary codes which represent deflection angles $\theta_y$ and $\theta_x$ (to be explained later) of the laser beam LB corresponding to said deflector drive signals $e_y$ and $e_x$ from the deflector driver 8, respectively.

(b) Receive portion 101

In an optical system for reception 104 a return laser pulse ④ reflected from the target is received by a photo-detector 13 through an interference filter 12 for elimination of background light (with a pass band of 8,500 Å ± 10 Å). The photo-detector 13 comprises a series arrangement of an APD (avalanche photo-diode) of high sensitivity and fast response and a variable gain preamplifier of two stage type, as described later by referring to FIGS. 8 and 27. The return laser pulse as received is converted photo-electrically into an electric pulse signal, that is to say, a video pulse signal ⑥ of very low power level, and is fed to the preamplifier.

Upon amplification of the video pulse signal a so-called sensitivity time control (STC) signal ⑤ generated by the ramp function generator 6 is fed to a preceding stage of the preamplifier in a manner such that a power amplification factor $P_{pre}$ of that stage is varied in proportion to $t^2$ for 33 nsec.$<t<$333 nsec., where t is time elapsed from an instant $T_A$ at which the laser pulse is emitted. As a result, attenuation in intensity of the return pulse from the target as a function of a propagation distance R of the laser pulse (which attenuation is proportional to $R^{-2}$) is compensated for. Therefore, the high rate video pulse signal ⑥ having a constant intensity irrespective of the propagation distance R can always be obtained from targets of the same material.

The video pulse signal of high rate ⑥ from the output of the photo-detector 13 is applied to a wideband amplifier 14 having a gain of 3 dB and a bandwidth of 1 MHz–1,000 MHz, where the video pulse signal is amplified to a predetermined level. The output of the amplifier 14 is supplied to a comparator of high rate 15 so as to shape it to form a pulse signal ⑦ when a predetermined threshold of the comparator is exceeded by said output.

(c) Information Processing Portion 102

When a flipflop 16 consisting of ECL is set by said carry signal ② and, subsequently, reset by the pulse signal ⑦, a propagation delay time of the laser pulse between the vehicle and the target (time necessary for a round trip) $\tau$ ($\tau$(nsec)=2R[m]/c, where c is the velocity of light and R is the distance between the vehicle and the target) is detected so that a pulse signal ⑧ of a pulse width $\tau$ is formed. The pulse signal ⑧ is supplied to the gate circuit (an AND circuit) 17 constructed by ECL to control passage of said clock signal of very high repetition rate ① through the gate circuit 17, so that a signal of pulse train ⑨ comprising successive $\tau$ clock pulses of the clock signal having the frequency of 1 GHz is obtained. The pulse train signal ⑨ is applied to a ten-bit binary counter 18 consisting of ECL to count the number of the clock pulses involved in the signal ⑨ at each period of 1.024 μsec. Then, a distance information $R_b$ in the form of a ten-bit parallel binary code corresponding to the distance R from the vehicle to the target can be obtained from such a count of the binary counter 18. The distance information $R_b$ together with said deflection information M and N is fed to the microcomputer 11, which functions through its arithmetic logical operations to decide whether the target as detected becomes an obstacle and to provide a decision output on line 105, which output may be displayed onto a display device not shown.

(B) Construction and Function of Optical Systems for Transmission and Reception.

Figure 8:
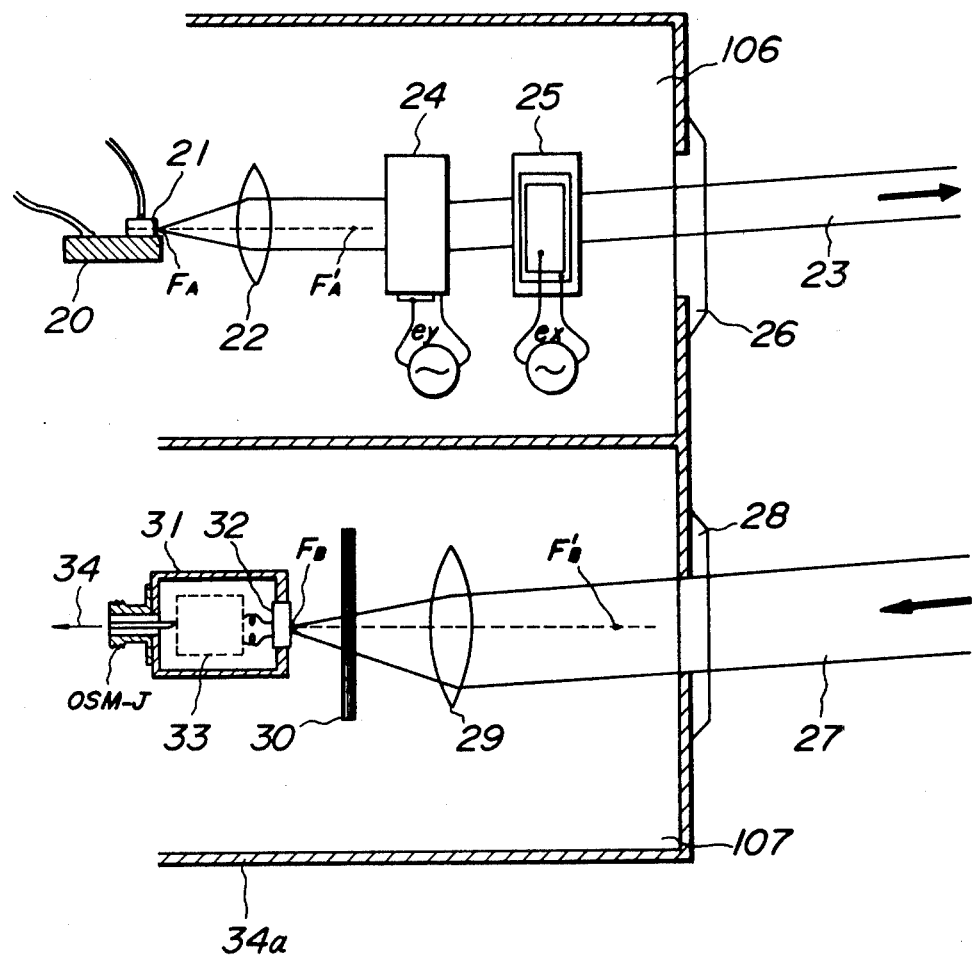
FIG. 8 is a partial section of an embodiment of optical systems for transmit and receive in the detection system according to the invention.

An example of optical systems for transmission and reception of a laser pulse is shown in FIG. 8.

An upper section of a light-shielding container 34a is assigned to an optical system for transmission 106 and a lower section to an optical system for reception 107, respectively. A chip 21 of a laser diode is mounted on a heat sink 20 and a convex lens 22 is located so that its focal point $F_A$ is placed in a cleavage plane of the chip 21. A laser light in a pulse form emanating from the focal point $F_A$ as a light source is collimated to a parallel ray of light by the lens 22, thereby resulting in a laser beam 23 in a pulse form. This laser beam is deflected by a Y-deflector 24 in the direction of the Y-axis in accordance with the drive signal $e_y$ and, then, is deflected by an X-deflector 25 in the direction of the X-axis according to the drive signal $e_x$. Thus, the laser beam is deflected in a two-dimensional pattern to scan the X-Y plane (methods of deflecting the laser beam will be explained in detail later).

The laser beam 23 as deflected is directed towards a space ahead of the vehicle via a transparent filter 26 for dust-proof purpose. On the other hand, a laser light 27 in a pulse form as reflected by a target (hereinafter referred to as "a reflected light") is received via a similar transparent filter 28 for dust-proof purpose. In practice, however, the reflected light is diffused over a wide range and only a portion of the reflected light which is actually received in shown in FIG. 8. The light received via the filter 28 will be referred to as "a received light", which is focussed by a convex lens 29 in the vicinity of its focus $F_B$ via an interference filter 30 of a narrow band which eliminates undesired background light such as the solar ray (a passband of 20 Å). An APD (avalanche photo-diode) 32 to be incorporated to an upstream portion of a photo-detector 31 is disposed so that a light receiving plane of the APD 32 is coincident with said focal point $F_B$. The received light in a pulse-shape is converted photo-electrically by the APD 32 into a video pulse signal of high rate and of very low level, which is amplified by a variable gain preamplifier 33 (which will be explained later) under the action of STC (Sensitivity Time Control), so that the high-rate video-pulse signal 34 having a predetermined constant level can be derived from a small coaxial connector of OSM-J.

Figure 9:
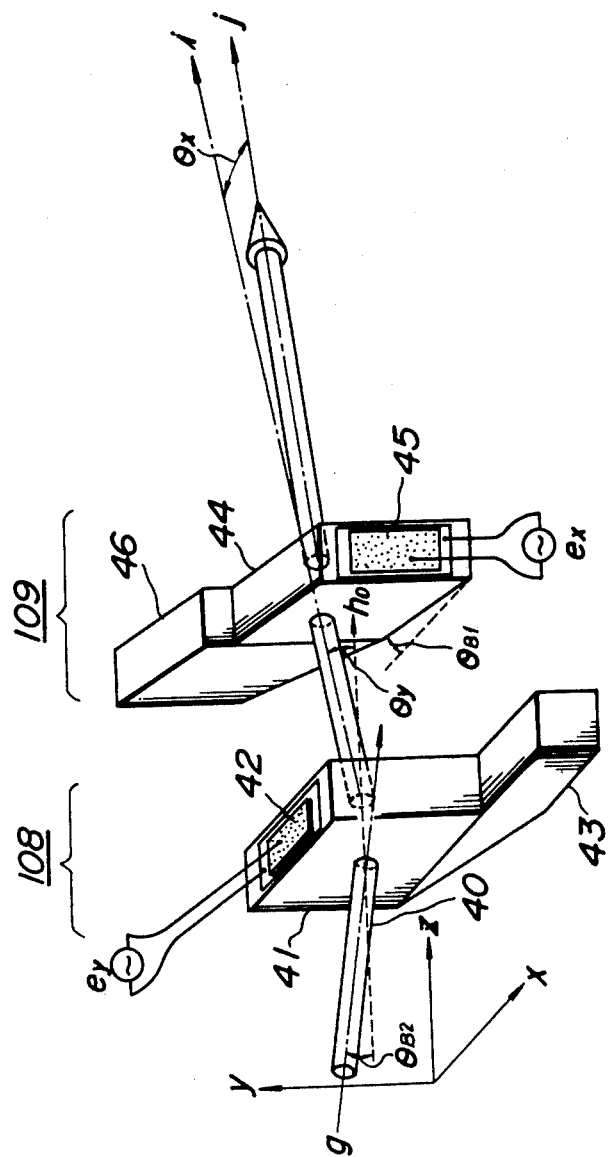
FIG. 9 is a perspective view showing an embodiment of a two-dimensional light deflector for the laser beam in accordance with the invention.

(2) METHODS FOR DEFLECTING LASER BEAM IN DETECTION SYSTEM OF OBSTACLES ACCORDING TO THE INVENTION (A) Acousto-optic Light Deflector (a) A preferred embodiment of a two-dimensional deflector FIG. 9 shows an embodiment of a two-dimensional deflector for a laser beam in accordance with the invention.

A laser beam to be deflected (hereinafter referred to as "a light beam") 40 from the laser diode is proportional with respect to a Y-deflector 108 and an X-deflector 109 as shown in FIG. 9. The Y-deflector 108 is disposed in parallel to an x-y plane and the X-deflector 109 is placed downstream of the deflector 108 at an angle of $\theta_{B1}$ to the x-y plane. The light beam 40 is first incident onto a deflection medium 41 of the Y-deflector 108 at an angle of $\theta_{B2}$ to the z-axis in the y-z plane (in FIG. 9, a broken line $h_0$ is parallel to the z-axis and $\theta_{B2}$ is equal to an angle between the line $h_0$ and a chained central line g of the light beam 40). At the Y-deflector 108 a signal $e_y$ of a high frequency $f_y$ is applied to a transducer 42 to produce an ultrasonic wave of a high frequency $f_y$, which propagates towards an absorption member 43 of the ultrasonic wave within the deflection medium 41. By the action of the ultrasonic wave (which will be explained in detail later) the light beam 40 is diffracted at an angle of $\theta_Y$ to the z-axis in the y-z plane ($\theta_Y$ is equal to an angle between the line $h_0$ and a chained central line i of the light beam as deflected). Subsequently, the beam 40 is incident onto a deflection medium 44 of the X-deflector 109 at an angle of $\theta_{B1}$ to the z-axis in the x-z plane.

Figure 10:
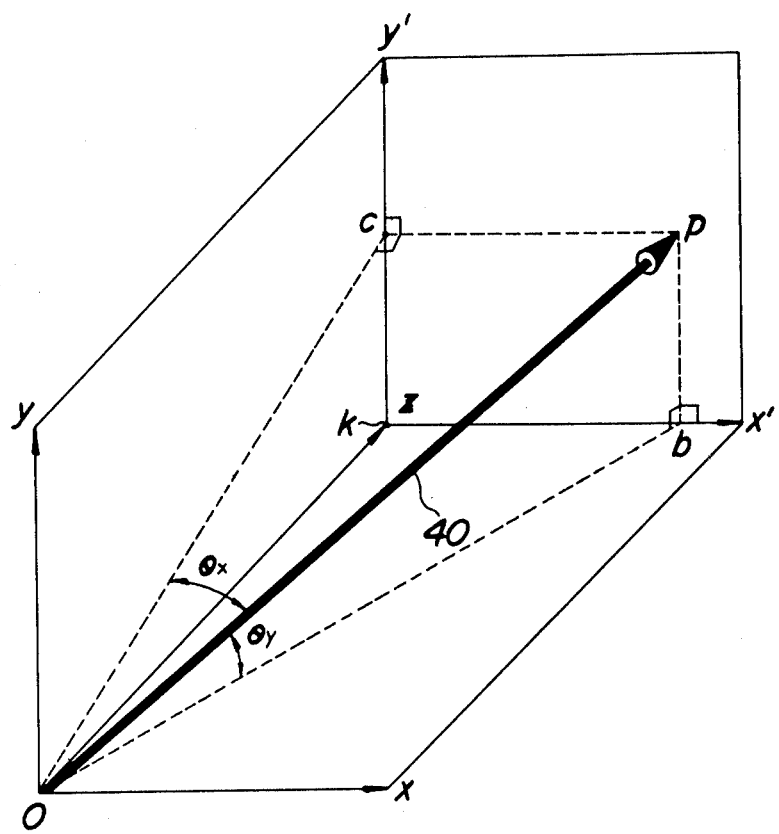
FIG. 10 is perspective view showing a relation between a diffraction angle of the laser beam and the three-dimensional trirectangular coordinates.

At the X-deflector 109 an ultrasonic wave of a high frequency $f_x$ is generated by means of a transducer 45 so that it propagates towards an absorption member 46 of the ultrasonic wave within the deflection medium 44. By an action of said ultrasonic wave the light beam 40 is diffracted again at an angle of $\theta_x$ to the z-axis in the x-z plane ($\theta_x$ is equal to an angle between the central line i of the light beam 40 before incidence onto the X-deflector 109 and a chained central line j of the light beam 40 after deflection at the X-deflector. Thus, the light beam 40 is caused to have the diffraction angles of $\theta_x$ and $\theta_Y$ to the z-axis, so that it can be deflected in a two-dimensional pattern by changing the frequencies $f_x$ and $f_y$ of the high frequency signals $e_x$ and $e_y$ (details of which will be explained later). Relations between the diffraction angles $\theta_x$ and $\theta_Y$ and a three-dimensional trirectangular coordinates x, y, z are defined as shown in FIG. 10, in which "O" represents a light source of the light beam 40, "P" a reflection point on a target, "a plane x'-y'" a plane which passes through the point P and is parallel to the x-y plane, "c" a point on the y'-axis corresponding to a line perpendicular to the y'-axis from the point P, and "b" a point on the x'-axis corresponding to a line perpendicular to the x'-axis from the point P. Then, the following relations are valid:

$$\angle POc = \theta_x \quad (5)$$

$$\angle POb = \theta_y \quad (6)$$

(b) Characteristics of Ultrasonic Deflector

Figure 11:
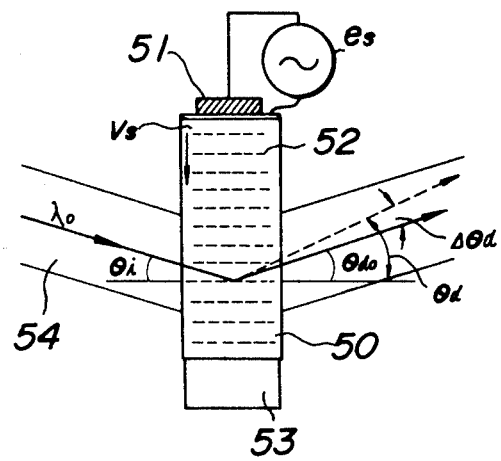
FIG. 11 is a sectional view showing a principle of operation of an acousto-optic light deflector.

FIG. 11 shows a sectional view of an embodiment of an ultrasonic deflector. When a high frequency signal $e_s$ (of a high frequency $f_s$) is applied to a deflection medium 50 via a transducer 51 as shown in FIG. 11, an ultrasonic wave 52 is produced to propagate within the deflection medium 50 towards a member 53 for absorbing the ultrasonic wave.

Upon propagation of the ultrasonic wave 52 through the deflection medium 50 variations of its refractive index with a period of a wavelength $\lambda_s$ of the ultrasonic wave occur due to the photoelastic effects. If a light beam (of a wavelength $\lambda_0$) 54 incident onto a wave front of this ultrasonic wave at an angle of $\theta_i$ to the wave front meets the conditions of the Bragg reflection as given by the following equations (7) or (8) and (9), the light beam is diffracted at an angle of $\theta_d$ to the wave front of the ultrasonic wave 52. Let $\theta_{i0}$ be an angle of incidence of the light beam and $\theta_{d0}$ be an angle of diffraction of the beam, conditions for diffraction may be expressed as follows:

(i) If the deflection medium is optically isotropic (referred to as an ordinary Bragg reflection), $$\theta_{i0} = \theta_{d0} = \theta_B = \sin^{-1}\left(\frac{\lambda_0}{2nv_s} \cdot f_0\right) \quad (7)$$

where
$\lambda_0$: wavelength of light
n: refractive index of deflection medium
$v_s$: propagation speed of acoustic wave within deflection medium
$f_0$: a frequency of ultrasonic wave.

(ii) If the deflection medium is an optically anisotropic crystal (referred to as an extraordinary Bragg reflection), with $f_s = f_1$ as the best point of diffraction, $$\theta_{i0} = \sin^{-1}\left(\frac{\lambda_0}{n_e \cdot v_s} \cdot f_1\right) \quad (8)$$

and $$\theta_{d0} \approx 0 \quad (9)$$

where $$f_1 = \frac{v_s}{\lambda_0} \cdot (n_0^2 - n_e^2)^{\frac{1}{2}} \quad (10)$$

$\lambda_0$: wavelength of light
$n_0$: refractive index of an ordinary ray of light
$f_s$: frequency of ultrasonic wave
$v_s$: propagation speed of acoustic wave within deflection medium
$n_e$: refractive index of an extraordinary ray of light.

When the frequency $f_s$ of the high frequency signal $e_s$ is caused to change by an amount of $\Delta f_s$ ($\Delta f_s \ll f_s$) in the proximity of the frequency $f_0$ or $f_1$ of the ultrasonic wave which satisfies the Bragg reflection conditions defined by eqs. (7)–(9), only the diffraction angle of $\theta_d$ can be varied by an amount of $\Delta \theta_d$ while the incidence angle of the light beam to the deflection medium is kept fixed, so that deflection of the light beam can be achieved. The variable component of deflection angle $\Delta \theta_d$ (in the range of $|\Delta \theta_d| \leq \pi/18 = 10°$) may be given as follows:

(i) In case of the optically isotropic medium;

$$\Delta \theta_d \approx \frac{\lambda_0}{n \cdot v_s} \cdot \Delta f_s = \frac{\lambda_0}{n \cdot v_s} (f_s - f_0) \quad (11)$$

(ii) In case of the optically anisotropic medium;

$$\Delta \theta_d \approx \frac{\lambda_0 \cdot f_1}{2n_0 \cdot v_s}\left(\frac{f_s}{f_1} - \frac{f_1}{f_s}\right) \quad (12)$$

Substituting in eq. (12) the following relation $$f_s = f_1 + \Delta f_s (\Delta f_s \ll f_s) \quad (12a)$$

and simplifying its result leads to $$\Delta \theta_d \approx \frac{\lambda_0}{n_0 \cdot v_s} \cdot \Delta f_s = \frac{\lambda_0}{n_0 \cdot v_s} \cdot (f_s - f_1) \quad (13)$$

It is apparent from eqs. (11) and (13) that the variable component of deflection angle $\Delta \theta_d$ is given by equations similar to each other for the both cases of the optically isotropic and anisotropic medium.

Therefore, if the light beam is deflected under the Bragg reflection conditions, the diffraction angle of $\theta_d$ may be given (in the range of $-10° \leq \Delta \theta_d \leq 10°$) as follows: for the optically isotropic medium:

$$\theta_d = \theta_{d0} + \Delta \theta_d \approx \theta_B + \frac{\lambda_0}{n \cdot v_s}(f_s - f_0) \quad (14)$$

or for the optically anisotropic medium:

$$\theta_d = \theta_{d0} + \Delta\theta_d \cong \frac{\lambda_0}{n_0 \cdot v_s}(f_s - f_1) \quad (15)$$

(c) Characteristics of Two-dimensional Deflector

Characteristics of the two-dimensional deflector described in the preceding section (a) will be considered hereinbelow. There are no substantial differences in characteristics between the deflector using an optically isotropic medium and that using an optically anisotropic medium, so that typically an ultrasonic deflector employing an optically isotropic medium will be referred to hereinafter.

(i) Characteristics of Y-Deflector

Figure 12:
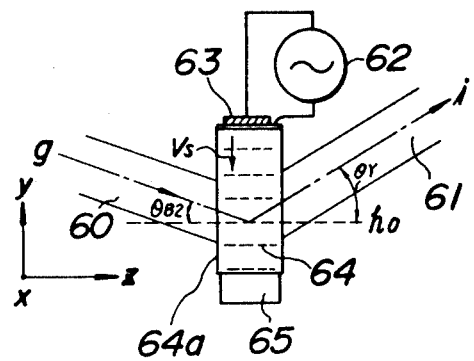
FIG. 12 is a sectional view of an embodiment of an acousto-optic Y-deflector.

In FIG. 12 the symbol $h_0$ represents again a broken line parallel to a wave front 64 of the ultrasonic wave, the symbol g a chained central line of an incident beam 60 and the symbol i a chained central line of a diffracted beam 61, respectively (where lines g and i are parallel to the y-z plane). Moreover, in FIG. 12 "$\theta_{B2}$" shows an angle of the line g to the line $h_0$ and "$\theta_Y$" an angle of the line i to the line $h_0$, respectively.

If in equation (7) "$f_0$" is replaced by "$F_y$" which is a central frequency to be explained later, the following equation can be obtained:

$$\theta_{B2} = \sin^{-1}\left(\frac{\lambda_0}{2n \cdot v_s} \cdot F_y\right) \quad (16)$$

If $\theta_{B2}$ is chosen as defined by eq. (14) so that the conditions of the Bragg reflection are satisfied, the following relation is held from eq. (14):

$$\theta_Y = \theta_{B2} + \frac{\lambda_0}{n \cdot v_s}(f_y - F_y).$$

Then, let a deflection angle be "$\theta_y$", the following equation can be obtained:

$$\left.\begin{array}{l}\theta_Y \cong \theta_{B2} + \theta_y \\ \theta_y \cong \frac{\lambda_0}{n \cdot v_s}(f_y - F_y)\end{array}\right\} \quad (17)$$

In FIG. 12 reference numeral 62 designates a signal source of the high frequency signal $e_y$, 63 a transducer, 64a a deflection medium and 65 an absorbing member for an ultrasonic wave, respectively.

(ii) Characteristics of X-Deflector

Figure 13:
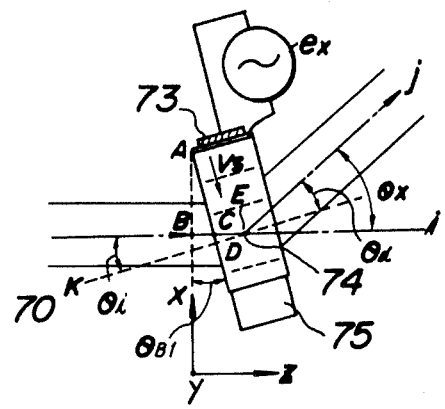
FIG. 13 is a sectional view of an embodiment of an acousto-optic X-deflector.

In FIG. 13 an ultrasonic deflector, which comprises a transducer 73, a deflection medium 74a, an absorbing member 75 for an ultrasonic wave, etc., is arranged at an angle of $\theta_{B1}$ to the x-y plane. A dashed line k represents a line parallel to a wave front 74 of the ultrasonic wave. Since the central line i of an incident beam 70 is parallel to the y-z plane, $\triangle ABC$ and $\triangle CDE$ are similar figures because of $\angle ABC = 90° = \angle CDE$, so that for $\theta_i$ a relation of $\theta_i = \theta_{B1}$ is valid and the following equation can be obtained:

$$\theta_x = \theta_d + \theta_i = \theta_d + \theta_{B1} \quad (18)$$

Then, if "$f_0$" in eq. (7) is replaced by "$F_x$" which is also a central frequency as explained later, the following equation can be derived:

$$\theta_i = \theta_{B1} = \sin^{-1}\left(\frac{\lambda_0}{2n \cdot v_s} \cdot F_x\right) \quad (19)$$

If $\theta_{B1}$ is chosen as given by eq. (19) so that the Bragg reflection conditions are fulfilled, a diffraction angle of $\theta_d$ may be given from eq. (14):

$$\theta_d \cong \theta_{B1} + \frac{\lambda_0}{n \cdot v_s}(f_x - F_x) \quad (20)$$

Therefore, letting a deflection angle be "$\theta_x$", the following equation can be obtained from eqs. (18) and (20):

$$\left.\begin{array}{l}\theta_x \cong 2\theta_{B1} + \theta_x \\ \theta_x \cong \frac{\lambda_0}{n \cdot v_s} \cdot (f_x - F_x)\end{array}\right\} \quad (21)$$

Figure 14:
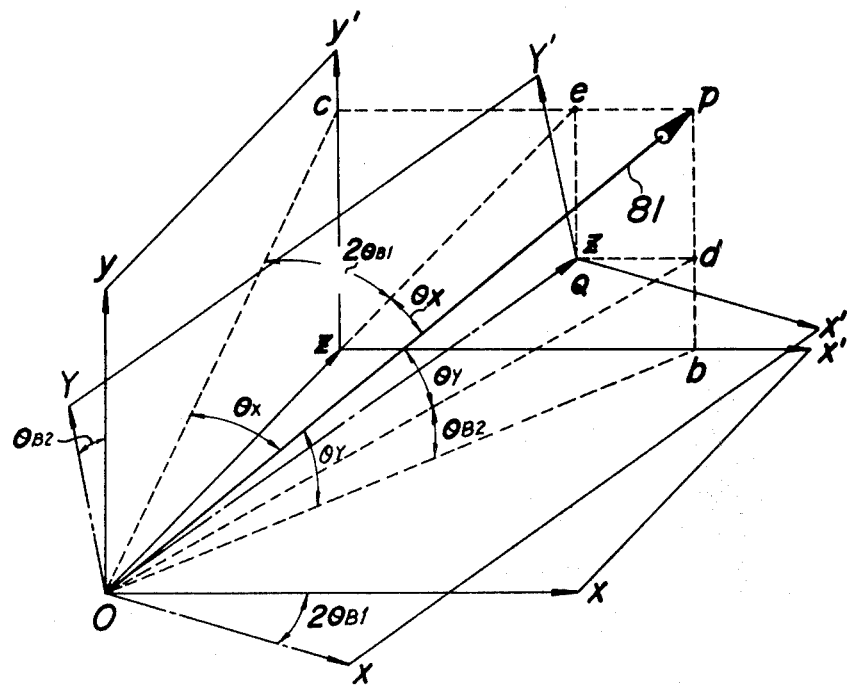
FIG. 14 is a perspective view illustrating relations of the three-dimensional trirectangular coordinates to diffraction angles $\theta_x$ and $\theta_y$ as given by the following equations (17) and (21), respectively.

(d) Relations between Three-Dimensional Coordinates and Deflection Angles $\theta_x$ and $\theta_y$ Relations between three-dimensional coordinates (x, y, z) and diffraction angles $\theta_X$ and $\theta_Y$ given by eqs. (17) and (21), respectively, may be shown diagrammatically as in FIG. 14, in which a point d is chosen on a line $\overline{Pb}$ so that $\angle dOb = \theta_{B2}$ is valid and a point e is selected on a line $\overline{Pc}$ so that $\angle cOe = 2\theta_{B1}$ is valid. In FIG. 14 a symbol Q indicates a reflection point of a light beam 81 by a target in case of $\theta_x$ and $\theta_y = 0$, and a direction in which the light beam 81 travels towards the reflection point Q is chosen to be a Z-axis, with which axis the central axis of the vehicle is caused to coincide. Relations between three-dimensional coordinates (X, Y, Z) for the Z-axis and the three-dimensional coordinates (x, y, z) will be described hereinbelow.

Figure 15:
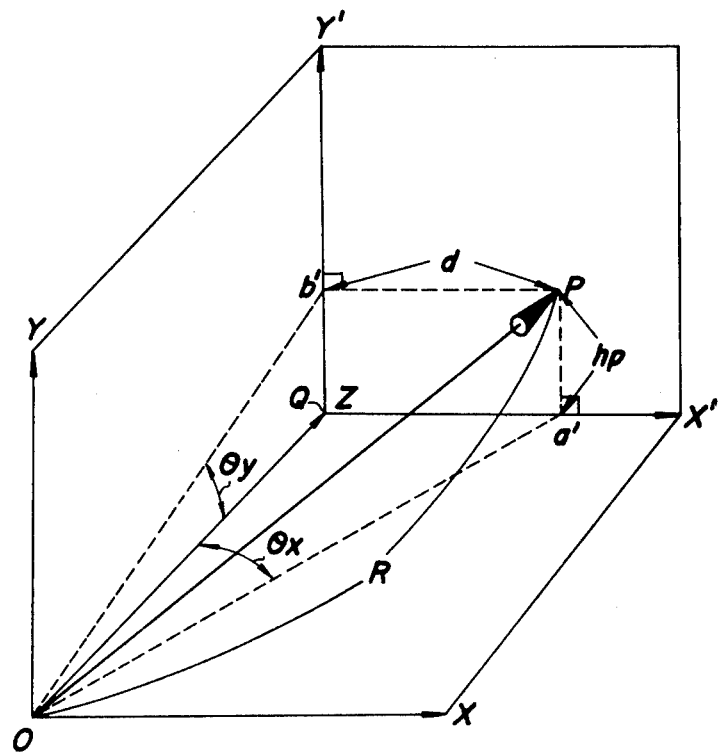
FIG. 15 is a perspective view showing relations of the three-dimensional trirectangular coordinates to deflection angles.

The X-axis makes an angle of $2\theta_{B1}$ to the x-axis in the x-z plane and the Y-axis has an angle of $\theta_{B2}$ to the y-axis in the y-z plane. In addition, the Z-axis is directed to the z-axis at angles of $\theta_x = 2\theta_{B1}$ and $\theta_Y = \theta_{B2}$ as defined in FIG. 10. As can be seen from FIG. 14, a relation $\angle QOd = \theta_x$ is valid and $\angle QOd$ lies on the X-Z plane, and also a relation $\angle eOQ = \theta_y$ in valid and $\angle eOQ$ exists on the Y-Z plane, so that relations between the deflection angles $\theta_x$ and $\theta_y$ and the three-dimensional coordinates (X, Y, Z) can be shown as in FIG. 15, in which O is a light source (a point from which a light beam emanates), P is a reflection point of the light beam on the target, a line $\overline{OP}$ represents the light beam, and the Z-axis is coincident with a central axis of the vehicle. Thus, the X-Z plane is parallel to the road surface. In FIG. 15 a plane which passes through the point P and is parallel to the X-Y plane is designated by a plane X'-Y', an intersection point of the Y'-axis with a line perpendicular thereto from the point P by b' and an intersection point of the X'-axis with a line vertical thereto from the point P by a', whereby relations of $\angle a'OQ = \theta_x$ and $\angle b'OQ = \theta_y$ are held. When a distance between the points O and P is represented by R and relations of $\overline{Pb'} = d$ and $\overline{Pa'} = h_p$ are introduced, $\overline{Ob'} \cong \overline{Oa'} \cong R$ is valid due to d and $h_p << R$, so that the following equations can be obtained:

$$d \cong R \cdot \sin\theta_x \cong R \cdot \theta_x \left( \text{for } -\frac{\pi}{18} \leq \theta_x \leq \frac{\pi}{18} \right) \quad (22)$$

$$h_p \cong R \cdot \sin\theta_y \cong R \cdot \theta_y \left( \text{for } -\frac{\pi}{36} \leq \theta_y \leq \frac{\pi}{36} \right) \quad (23)$$

(B) Deflector Driver and Sweeping Characteristics of Light Beam:

(a) Deflector Driver

Figure 16:
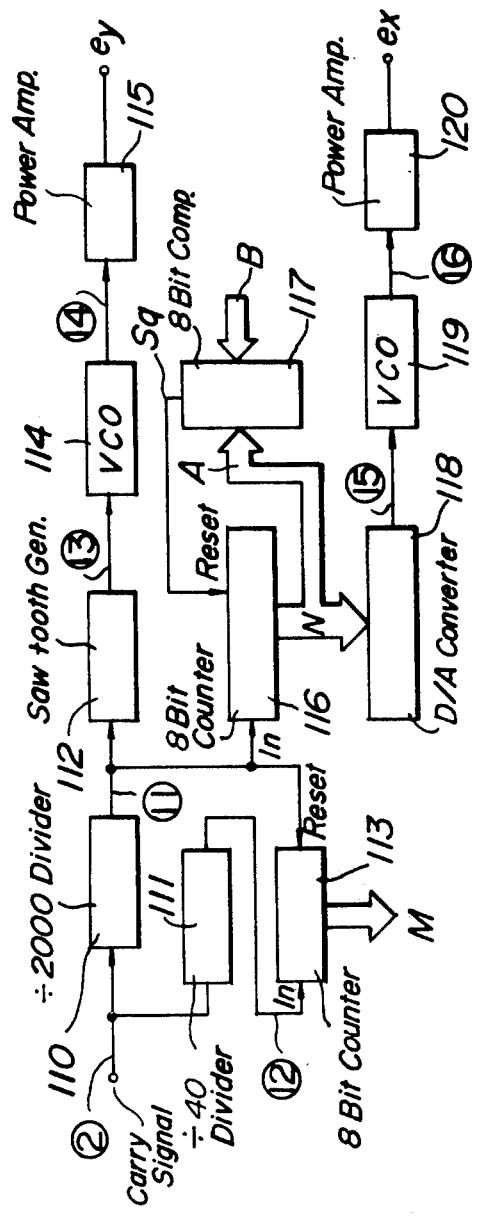
FIG. 16 is a block diagram of an embodiment of a deflector driver according to the invention.
Figure 17:
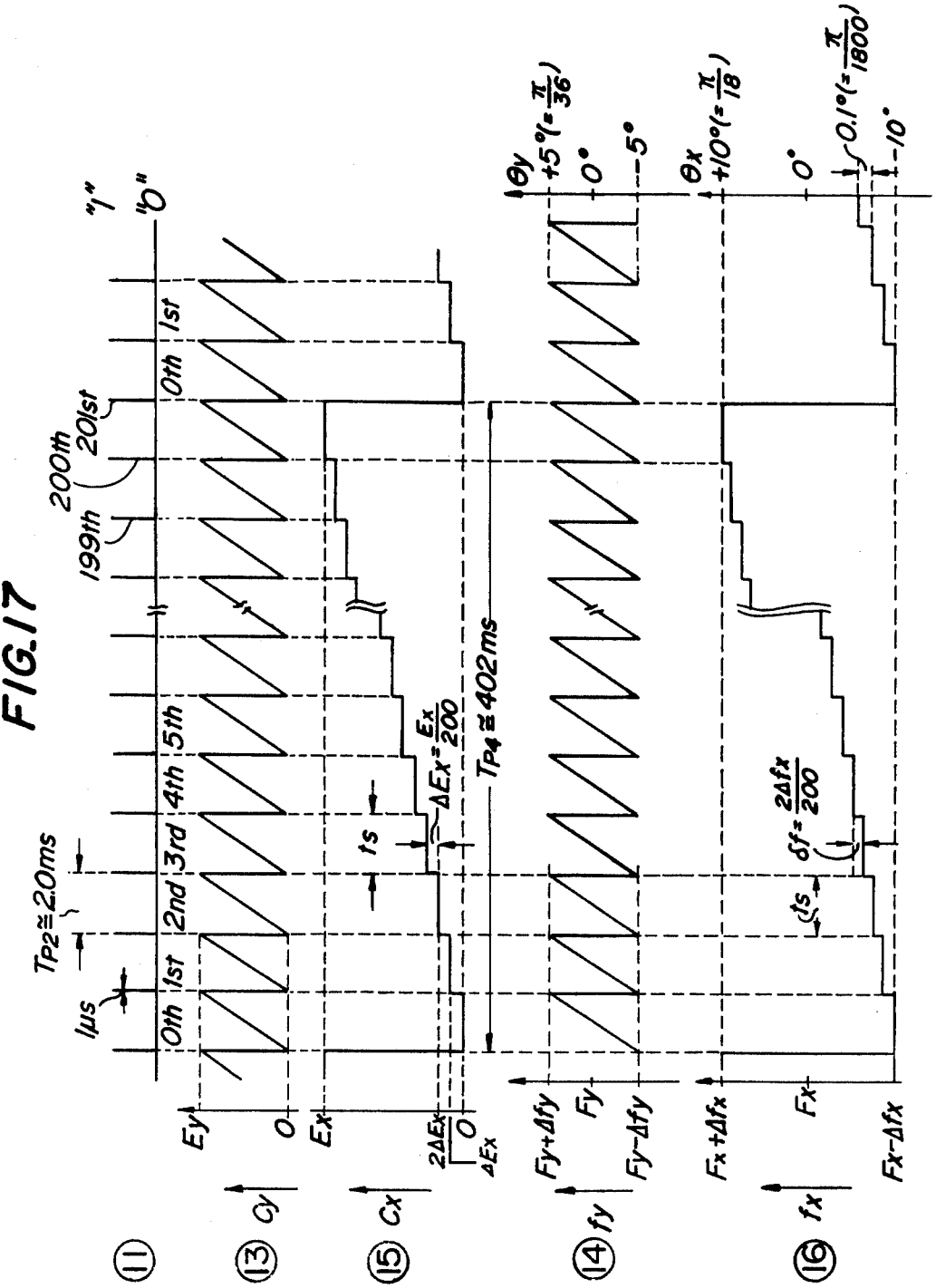
FIGS. 17 and 18 are timing charts for the relevant portions in FIG. 16.
Figure 18:
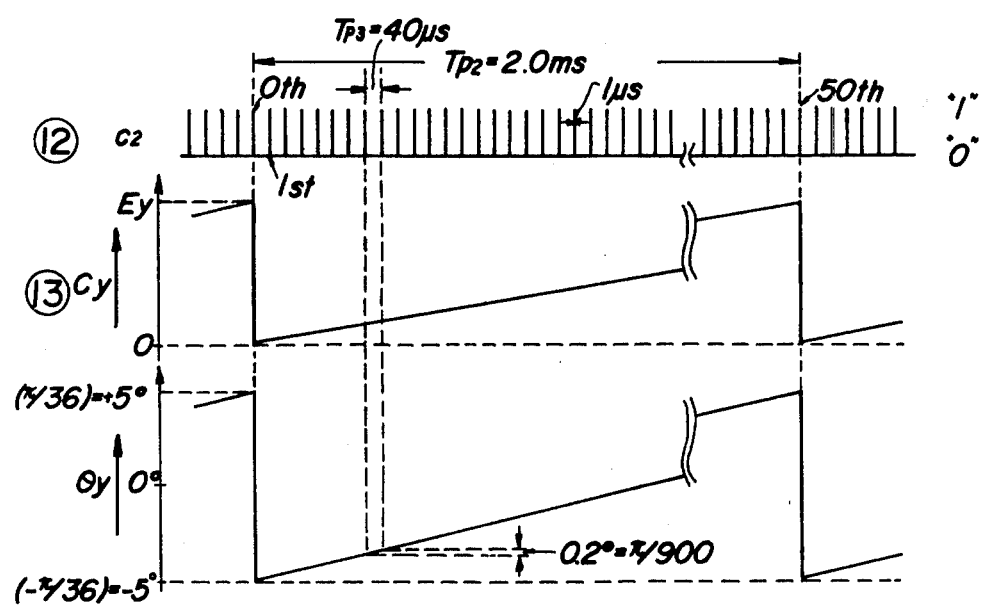

FIG. 16 illustrates an embodiment of a deflector driver and FIGS. 17 and 18 show timing charts for signals at various portions of FIG. 16. Waveforms 11 – ⑯ in FIGS. 17 and 18 represent signals appearing at various portions of FIG. 16 as indicated by the corresponding number surrounded by a circle, respectively.

In FIG. 16, the carry signal ② (having a period of $T_{P1} \cong 1$ μs) from the output of the nine-bit binary counter 4 as shown in FIG. 6 is first applied to a divide-by-2000 frequency divider 110 and a divide-by-40 frequency divider 111 so that a clock signal ⑪ having a pulse width of 1 μs and a period of $T_{p2} \cong 2.0$ ms and another clock signal ⑫ having a pulse width of 1 μs and a period of $T_{p3} \cong 40$ μs are produced at their relevant outputs, respectively.

(i) Signal Processing associated with Y-Deflector

The clock signal ⑪ is fed to a sawtooth wave generator 112 to produce a sawtooth wave ⑬ having a peak value of $E_y$ and a period of 2.0 ms. When the clock signal ⑫ and the clock signal ⑪ are applied to an eight-bit binary counter 113 as an input signal and a reset signal, respectively, the counter 113 produces an eight-bit parallel binary code M, which is synchronized with the sawtooth wave ⑬ and the contents of which are incremented at every interval of 40 μs in response to variations in voltage of the sawtooth wave ⑬. By referring to FIGS. 6, 16, 17 and 18 it can be seen that during said interval of 40 μs the ranging by the laser pulse ③ having a period of about 1 μs is effected forty times and all data resulting therefrom is processed by the microcomputer to derive an averaged value of said all data of distance, thereby accomplishing improvements in reliability of detected data to a great extent.

That is, relations between the binary code M and a voltage level $C_y$ of the sawtooth wave ⑬ are shown in the following Table 1.

TABLE 1

| $C_y$ | M | Values of M converted to Decimal System |
|---|---|---|
| $0 \leq C_y < \frac{E_y}{50}$ | 0 0 0 0 0 0 0 0 | 0 |
| $\frac{E_y}{50} \leq C_y < \frac{2E_y}{50}$ | 0 0 0 0 0 0 0 1 | 1 |
| $\frac{2E_y}{50} \leq C_y < \frac{3E_y}{50}$ | 0 0 0 0 0 0 1 0 | 2 |
| . | . | . |
| . | . | . |
| . | . | . |
| $\frac{49E_y}{50} \leq C_y < \frac{50E_y}{50}$ | 0 0 1 1 0 0 0 1 | 49 |

Said sawtooth wave ⑬ is applied to a voltage-controlled oscillator (VCO) 114 which is formed by a high frequency oscillator of Colpitts type with which a variable-capacitance diode is incorporated. Then, VCO 114 produces a frequency-modulated (FM) signal ⑭, the frequency $f_y$ of which varies in the form of a sawtooth wave centered at a frequency of $F_y$ with a maximum frequency shift of $\Delta f_y$. The FM signal ⑭ is amplified by a wideband power amplifier 115 to a power level necessary for driving the Y-deflector, so that the power amplifier 115 provides a high output signal $e_y$ of high frequency (frequency of $f_y$). From eq. (17) the deflection angle $\theta_y$ of the Y-deflector is given by:

$$\theta_y \cong \frac{\lambda_0}{n \cdot v_s} (f_y - F_y)$$

whereby the maximum frequency shift $\Delta f_y$ is set in such a manner that the maximum deflection angle of $\pi/36$ ($= 5°$) is attained at the frequency of $f_y = F_y + \Delta f_y$, that is to say, the following relation is valid.

$$\frac{\pi}{36} = \frac{\lambda_0}{n \cdot v_s} \cdot \Delta f_y \quad (24)$$

Then, the relation between the deflection angle $\theta_y$ and the voltage level $C_y$ of the sawtooth wave ⑬ may be expressed by:

$$\theta_y \cong \frac{\pi}{36} \cdot \left( 2 \cdot \frac{C_y}{E_y} - 1 \right) \quad (25)$$

From the table 1 the relation between values of $C_y$ and M (decimal notation) may be written approximately by:

$$C_y \cong E_y \cdot \frac{M}{50} \quad (26)$$

and from eqs. (25) and (26) the following equation can be derived:

$$\theta_y \cong \frac{\pi}{36} \left( \frac{M}{25} - 1 \right) = \frac{\pi}{900} (M - 25) \quad (27)$$

where $0 \leq M \leq 49$. Therefore, the eight-bit parallel binary information M serves as a coded information indicating the deflection angle $\theta_y$ of the Y-deflector, and hence, the coded information M is called as deflection information of the Y-axis.

(ii) Signal Processing concerned with X-Deflector

Said clock signal ⑪ is supplied to an eight-bit binary counter 116 as its input signal, which counter operates so as to produce an eight-bit parallel binary code N the contents of which is updated at every 201st clock pulse of the clock signal ⑪, that is to say, at a period of $T_{p4} \cong 402$ ms. The code N is updated as follows. The output code N of the counter 116 is always supplied to an eight-bit comparator 117 as an A input to compare with a B input (11001001). The output code N of the counter 116 is incremented corresponding to the number of pulses in the clock signal ⑪ as supplied to the counter 116 and becomes equal to "11001001" (201 in the decimal system) at the 201st pulse of the clock signal ⑪. At this time the inputs A and B to the eight-bit comparator 117 coincide with each other, so that the comparator 117 sends out a coincidence signal $S_q$ for A=B to reset the counter 116. As described above the contents of the parallel binary code N are enabled to change from "00000000" (0 in the decimal system) to "11001001" (200 in the decimal system).

In order to convert into an analog signal the binary code N is fed to a digital/analog converter 118, so that from an output of the D/A converter a stepwise signal ⑮ can be derived which has a step duration of $t_s \approx 2.0$ ms, a step size of $\Delta E_x = E_x/200$, a repetitive period of 402 ms and a peak value of $E_x$. The stepwise signal ⑮ is applied to a voltage-controlled oscillator 119 of similar construction to said VCO 114 so as to derive an FM (frequency-modulated signal ⑯ of a frequency $f_x$ which is centered at the frequency $F_x$ with a maximum frequency shift $\Delta f_x$ and varies stepwisely with a step duration of $t_s \approx 2.0$ ms and a step size of $\delta f \approx \Delta f_x/100$. The FM signal ⑯ is supplied to a wideband power amplifier 120 to raise its power level to that required for driving the X-deflector, thereby providing an output signal $e_x$ of high frequency and amplitude (frequency of $f_x$) at the output of the amplifier 120. From eg. (21) the deflection angle $\theta_x$ is given by:

$$\theta_x \cong \frac{\lambda_0}{n \cdot v_s} (f_x - F_x) \qquad (21)$$

Thus, the maximum frequency shift $\Delta f_x$ is set in a manner such that in case of $f_x = F_x + \Delta f_x$ the maximum deflection angle is equal to $\pi/18$ (=10°), namely the following equation is valid.

$$\frac{\pi}{18} \cong \frac{\lambda_0}{n \cdot v_s} \cdot \Delta f_x \qquad (28)$$

Relations between the deflection angle $\theta_x$ and the binary code N may be derived as follows.

First, relations between the frequency $f_x$ of the FM signal 16 and the voltage level $C_x$ of the stepwise signal 15 is expressed by:

$$f_x = F_x + \Delta f_x \left( \frac{2C_x}{E_x} - 1 \right) \qquad (29)$$

Moreover, relations between the output N of the counter 116 (values in decimal system) and the voltage level $C_x$ of the stepwise signal ⑮ is written as:

$$C_x = E_x \cdot \frac{N}{200} \qquad (30)$$

From eq. (29) and eq. (30) is derived $$f_x = F_x + \Delta f_x \left( \frac{N}{100} - 1 \right) \qquad (31)$$

Substituting eq. (31) in eq. (21) results in $$\theta_x \cong \frac{\lambda_0}{n \cdot v_s} \cdot \Delta f_x \left( \frac{N}{100} - 1 \right),$$

and substituting eq. (28) in this relation yields $$\theta_x \cong \frac{\pi}{18} \left( \frac{N}{100} - 1 \right) = \frac{\pi}{1800} (N - 100) \qquad (32)$$

where $0 \leq N \leq 200$. It is apparent from eq. (32) that the eight-bit parallel binary code N is coded information representing the deflection angle $\theta_x$ of the X-deflector, and thus, is called as X-axis deflection information.

(b) Scanning Characteristics of Light Beam

Figure 19:
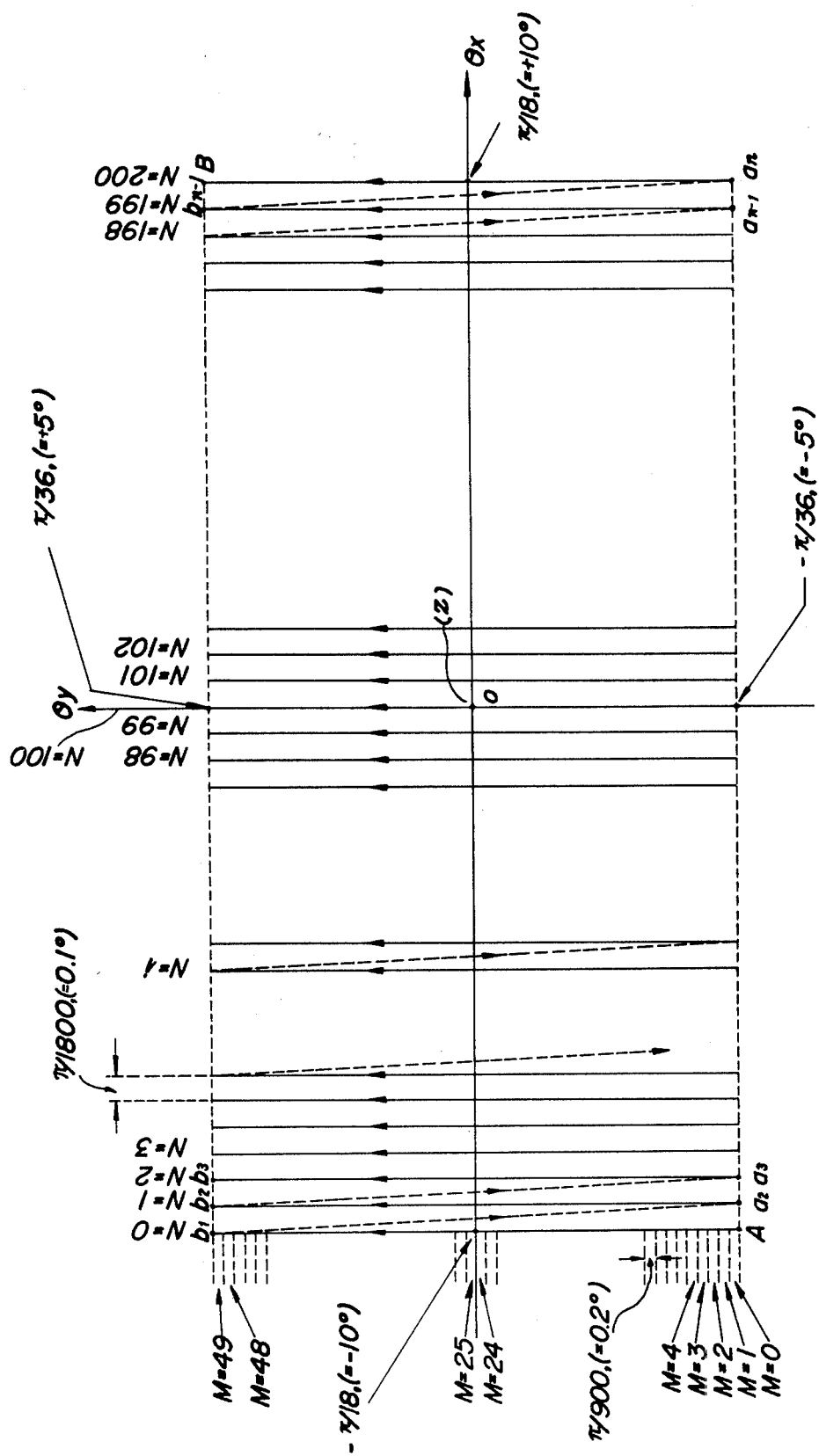
FIG. 19 shows an example of a two-dimensional scanning pattern of the laser beam in accordance with the invention.

Scanning characteristics of the light beam are shown in FIG. 19, in which the deflection angle $\theta_x$ with respect to the X-axis is plotted on the abscissa, the deflection angle $\theta_y$ in respect of the Y-axis is plotted on the ordinate and a line which is perpendicular to the $\theta_x$-$\theta_y$ plane and passes through a point O is defined as the Z-axis.

Respective ranges of $\theta_x$ and $\theta_y$ are given by:

$$-\frac{\pi}{18} (= -10°) \leq \theta_x \leq \frac{\pi}{18} (= 10°) \qquad (33)$$

$$-\frac{\pi}{36} (= -5°) \leq \theta_y \leq \frac{\pi}{36} (= 5°) \qquad (34)$$

A light beam scans from a starting point A to an end point B along a scanning path shown by solid lines in the direction of arrows (such as A→b₁→a₂→b-2→a₃→b₃...→aₙ₋₁→bₙ₋₁→aₙ→B) for a time interval of about 402 msec. As can be seen from eq. (27) and eq. (32) the deflection angle $\theta_y$ changes corresponding to the code M and the deflection angle $\theta_x$ varies corresponding to the code N, respectively. The deflection angle $\theta_y$ changes from $$-\frac{\pi}{36} (= -5°) \text{ to } \frac{\pi}{36} (= 5°)$$

in a continuous manner, while the deflection angle $\theta_x$ varies two hundred and one times from $$-\frac{\pi}{18} (= -10°) \text{ to } \frac{\pi}{18} (= 10°)$$

at a spacing of $\frac{\pi}{1800} (= 0.1°)$ in a discontinuous or intermittent manner. The value of the code M is changed at every interval of 40 μsec. so that it is renewed at a period of $T_{p2} \cong 2$ ms, and the value of the code N is varied at every interval of 2 msec. so that it is updated at a period of $T_{p4} \cong 402$ ms.

As described above the light beam is enabled to scan the space at the high rate in a two-dimensional sense and thus to detect the presence or absence of a target and its direction if it is present.

(3) PULSE MODULATION OF LASER LIGHT AND DETECTION OR REFLECTED LIGHT PULSE (A) Pulse Modulation of Laser Light Operations of the high-rate pulse driver 5, which produces a laser light in pulse mode by changing a current flowing through the laser diode 7 shown in FIG. 6 into the form of pulse, and direct modulation of the laser diode will be explained hereinbelow.

(a) Direct Modulation of Laser Diode:

(i) Problems

Figure 20:
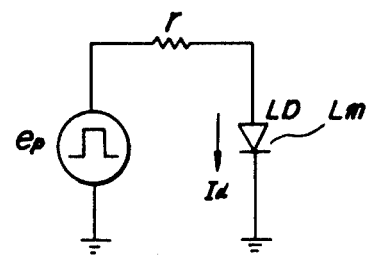
FIG. 20 is a simplified schematic diagram of a conventional pulse driver for modulating the laser beam in pulse mode.
Figure 21:
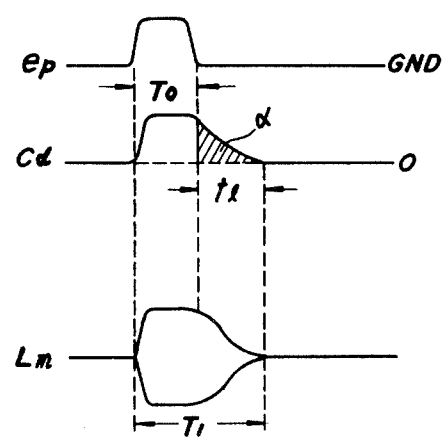
FIG. 21 is a timing chart associated with FIG. 20.

It is known that if a high-rate pulse signal $e_p$ in the order of a pulse width $T_0 = 1$ ns is applied to a laser diode LD as shown in FIG. 20, a pulse width $T_1$ of the modulated laser light $L_m$ becomes considerably longer than the pulse width $T_0$ of the pulse $e_p$ as applied (by an amount of $t_l$). As shown in FIG. 21 this is due to the fact that carriers injected by a current $I_d$ flowing through the diode LD remains during a lifetime $t_l (\cong 2 \sim 3$ ns) of the carriers (corresponding to stored carriers as indicated by a hatched portion $\alpha$ in a curve representing variations of a carrier density $C_d$ as a function of time), and thus, the diode LD light until the stored carriers $\alpha$ are extinguished.

(ii) Solutions to Problems

Figure 22:
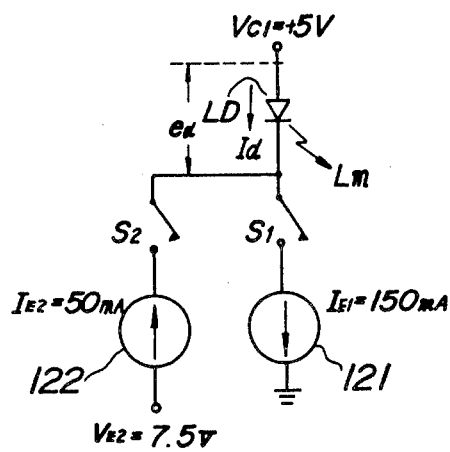
FIG. 22 shows an equivalent circuit of a pulse driver of high-rate according to the invention.
Figure 23:
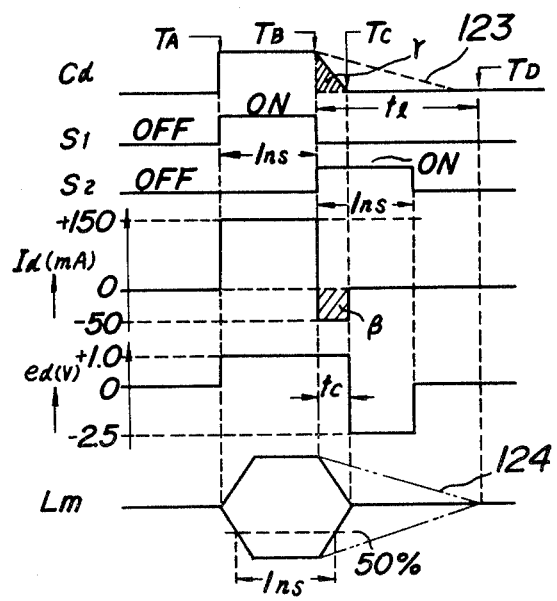
FIG. 23 is a timing chart for FIG. 22.

According to the invention an equivalent circuit shown in FIG. 22 (which is the equivalent circuit of a high-rate pulse driver illustrated in FIG. 24 as referred to later) is used to compensate for the stored carriers in a manner such that the laser light is pulse-modulated at a very high rate. FIG. 23 shows waveforms of signals at relevant portions of FIG. 22. As shown in FIG. 22, constant current sources 121 and 122 of different polarities are connected to the cathode of the laser diode LD via switches $S_1$ and $S_2$, respectively.

The switch $S_1$ is closed or ON during a time period of $T_A T_B = 1$ ns, whereas the switch $S_2$ is closed or ON during a time period of 1 ns from the instant $T_B$. When the switch $S_1$ becomes ON at the instant $T_A$, a current $I_d = +150$ mA flows through the laser diode LD by an action of the constant current source 121 which enables to flow a current $I_{E1} = 150$ mA, so that the laser diode LD emits light so as to produce the modulated laser light $L_m$.

When the switch $S_1$ becomes OFF at the instant $T_B$ and, simultaneously, the switch $S_2$ renders ON, a reverse current $I_d = -50$ mA (as designated by a hatched portion $\beta$ in FIG. 23) flows through the diode LD until the carriers stored therein are absorbed, so that the latter is caused to extinguish at an instant $T_c$ (as shown by a hatched part $\gamma$ in FIG. 23). When the carrier density $C_d$ of the diode is reduced to zero, the reverse current $I_d$ decreases approximately to zero.

When the carrier density of the laser diode LD reaches zero, emitting light by the diode LD is stopped, and thus, the modulated laser light $L_m$ is rendered to zero. DC sources $V_{c1}$ and $V_{E2}$ are chosen to $V_{c1} = +5$ V and $V_{E2} = +7.5$ V, respectively, in a manner such that the voltage $e_d$ across the diode LD can be maintained fully lower than a breakdown voltage of the diode when it is reversebiased by $e_d$ after the instant $T_c$.

If the switch $S_2$ and the constant current source 122 are not provided, it is not effected to absorb the stored carriers by applying the reverse current to the diode LD, whereas the carrier density $C_d$ of the diode LD gradually decreases as shown by a broken line 123 until an instant $T_D$ at which the stored carriers are extinguished spontaneously. Therefore, the modulated laser light $L_m$ is caused to have a pulse waveform which extends or spreads substantially as indicated by a chained line 124. Comparing a time period $t_c$ required for absorbing the stored carriers with a time period $t_l$ necessary for spontaneous extinguishment of the stored carriers it may be seen from 1 ns $\ll < t_l$ and $t_c \ll < 1$ ns that functions of the switch $S_2$ and the constant current source 122 are very effective to prevent the pulse width of the modulated laser light LD from being spread.

(b) High-rate Pulse Driver:

Now, construction and functions of the high-rate pulse driver which enables production of the laser pulse by directly modulating the laser diode 7 as shown in FIG. 6 will be explained in detail.

Figure 24:
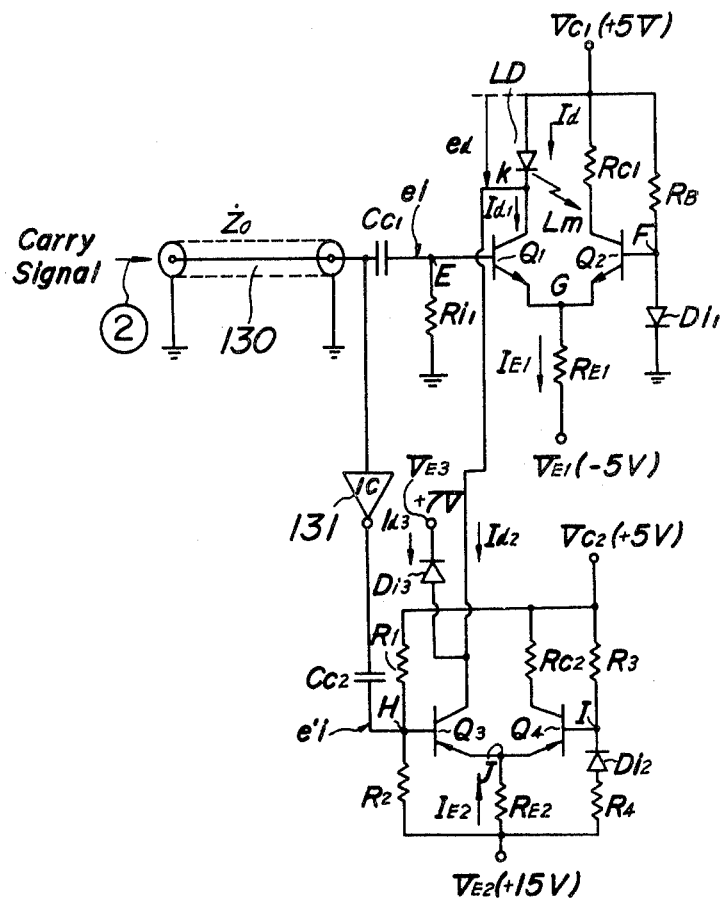
FIG. 24 is a schematic diagram of an embodiment of the high-rate pulse driver according to the invention.
Figure 25:
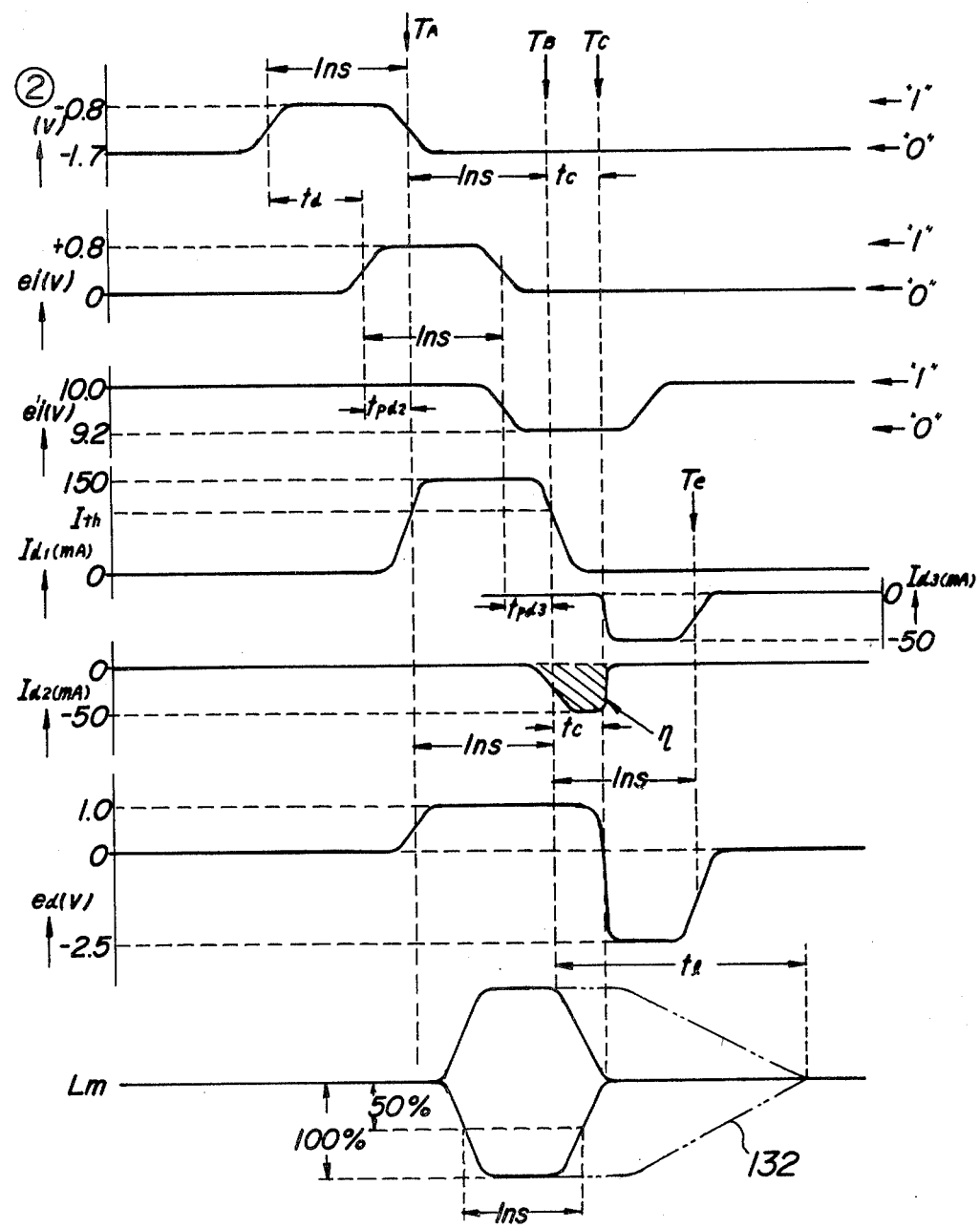
FIG. 25 is a timing chart for FIG. 24.

A schematic diagram of an embodiment of the pulse driver is shown in FIG. 24, and a timing chart for relevant portions of FIG. 24 is illustrated in FIG. 25. The carry signal ② with a pulse of 1 ns is supplied to a base E of a transistor $Q_1$ via a coaxial cable 130 having a characteristic impedance $Z_0 = 50 \, \Omega$. The transistor $Q_1$ and a transistor $Q_2$ constitute an emitter coupled logic, and constants of the relevant circuit elements are suitably chosen so that the transistor $Q_1$ is normally OFF. For the transistors $Q_1$ and $Q_2$ an NPN transistor is used, preferably having a maximum ratedcollector current $I_c \geq 200$ mA and a transistor frequency $f_T \geq 3$ GHz.

A pulse signal $e_i$ appearing at the point E changes to level "1" after a propagation delay time $t_d$ of the coaxial cable 130 from the carry signal ②, thereby rendering the transistor $Q_1$ ON so that a constant current $I_{d1} = 150$ mA can flow through the laser diode LD connected to the collector of the transistor $Q_1$. Then, the current $I_{d1}$ flows after a delay time $t_{pd2}$ of the transistor $Q_1$ with respect to the signal $e_i$. For a diode $D_{i1}$ connected to the base of the transistor $Q_2$ is used a silicon-Schottky diode.

The transistors $Q_1$ and $Q_2$ serve as the switch $S_1$ and the constant current source 121 as shown in FIG. 22. After a slight delay of the laser diode LD itself from the instant $T_A$ at which the current through the laser diode exceeds a predetermined threshold $I_{th}$, the diode LD starts to emit light to produce the modulated light $L_m$, as shown in FIG. 25. At the instant $T_B$ after, lapse of 1 ns from the instant $T_A$, the transistor $Q_1$ returns to OFF-state and the current $I_{d1}$ through the laser diode LD goes back to zero after passing downwardly through the threshold $I_{th}$. The carry signal ② which is passed through the coaxial cable 130 and an inverter 131 of ECL (emitter coupled logic) type having a propagation delay time $t_{pd1} \cong 1.0$ ns appears as a pulse signal $e'_i$, which goes down to level "0" after a delay of $(1 \text{ ns} - t_{pd2})$ from the instant $T_A$.

This pulse signal $e'_i$ is fed to a base H of a transistor $Q_3$ the collector of which is connected to the cathode of the laser diode LD.

The transistor $Q_3$ together with a transistor $Q_4$ forms an ECL (emitter coupled logic), and circuit constants relevant to these transistors are chosen properly so that the transistor $Q_3$ is normally OFF.

It is preferred that a PNP transistor having a maximum rated-collector current $I_c \geq 100$ mA and a transition frequency $f_T \geq 3$ GHz is used for the transistors $Q_3$ and $Q_4$ and a silicon-Schottky diode for a diode $D_{i2}$, respectively. If a delay time $t_{pd3}$ of the transistor $Q_3$ is selected approximately equal to $t_{pd2}$ ($t_{pd3} \cong t_{pd2}$), level "0" of the pulse signal $e'_i$ renders the transistor $Q_3$ ON so that just from the instant $T_B$ the constant current flows through the collector of the transistor $Q_3$, whereby a reverse current $I_{d2} = -50$ mA (as indicated by $\eta$ in the waveform $I_{d2}$) which serves for absorbing the carriers stored in the laser diode LD flows through the transistor $Q_3$ until an instant $T_c$ at which the stored carriers are extinguished.

When the current $I_{d2} = -50$ mA goes back to zero at the instant $T_c$, a constant current $I_{d3} = -50$ mA flows through a silicon-Schottky diode $D_{i3}$ until an instant $T_e$ which corresponds to 1 ns later than the instant $T_B$ so that the voltage across the laser diode LD is maintained at a reverse bias of $-2.5$ V from the instant $T_c$ to the instant $T_e$. When the carriers stored in the laser diode extinguish at the instant $T_c$, light emitting action of the laser diode is stopped and the modulated light $L_m$ returns to zero. The transistors $Q_3$ and $Q_4$ function as the switch $S_2$ and the constant current source 122 shown in FIG. 22.

Figure 29:
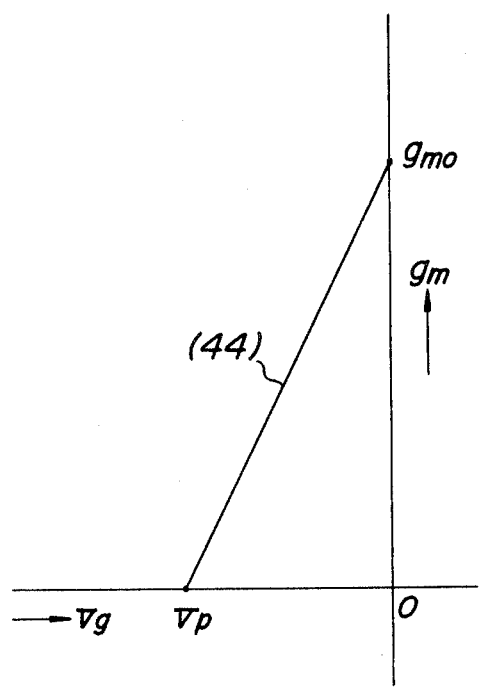
FIG. 29 is a characteristic graph as given by the following equation (44)

Values of the DC supply sources for the respective circuits relating to the first pair of transistors $Q_1$ and $Q_2$ and the second pair of transistors $Q_3$ and $Q_4$ are preferably chosen to $V_{c1}=+5$ V, $V_{E1}=-5$ V, $V_{c2}=+5$ V and $V_{E2}=+15$ V so that the constant currents $I_{d1}$ and $I_{d2}$ can be set to $I_{d1}=150$ mA and $I_{d2}=-50$ mA, respectively. In addition, $V_{E3}$ is chosen to $+7$ V so that the reverse bias across the laser diode LD can be set to $-2.5$ V. Let $I_d$ be the current flowing through the diode LD it is given by $I_d=I_{d1}+I_{d2}$. The circuitry as shown in FIG. 24 is implemented in a manner such that the pulse width of the modulated laser light (laser pulse) $L_m$ is made substantially equal to the pulse width of 1 ns of the carry signal ②, which is the input pulse to the circuitry, by absorbing the carriers stored in the laser diode LD with the constant current $I_{d2}=-50$ mA flowing through the transistor $Q_3$. IF the stored carriers in the laser diode LD are not absorbed by means of the transistor $Q_3$, the pulse waveform of the modulated light $L_m$ is substantially spreaded or extended as designated by a chained line 132 in the lowermost waveform of FIG. 29 (wherein $t_l<<1$ ns as previously described with respect to FIG. 23).

It should be noted that FIG. 22 shows a circuit equivalent to the circuitry in FIG. 24.

Figure 26:
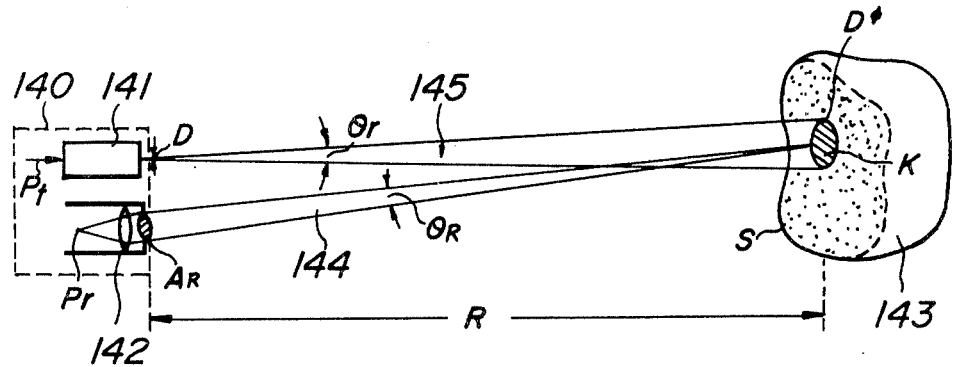
FIG. 26 shows diagrammatically a relation between a laser radar and a target.

(B) Detection of Reflected Light pulse (a) Laser Radar Equation:

FIG. 26 shows diagrammatically relations between a laser beam and a light reflected by a target. For FIG. 26 a relation between a transmit power $P_t$ and a receive power $P_r$ of a radar 140 using a laser light is given from the radar equation as follows:

$$\frac{P_r}{P_t} = K \cdot \frac{A_R}{4\pi R^2} \cdot t_T \cdot t_R \cdot L_R \tag{35}$$

where
K: reflection factor of the target
$A_R$: area for collecting light in optical system for reception
$t_T$: transmission factor of optical system for transmission
$t_R$: transmission factor of optical system for reception
R: distance between the radar and the target
$L_R$: propagation loss in air.

A solid angle $\theta_R$ of a received light 144 may be expressed by $\theta_R=A_R/4\pi R^2$. Eq. (35) is valid when, as shown in FIG. 26, a spot size $D^\phi$ of a transmit laser beam 145 at a reflecting face S of a target 143 is fully small in comparison with the reflecting face S. If a diameter of the laser beam at an output of a transmit optical system 141 is represented by D and a wavelength of the laser light by $\lambda_0$, a spread angle $\theta_T$ of the laser beam be given by:

$$\theta_T \cong \frac{\lambda_0}{D} \text{ [rad.]} \tag{36}$$

The spot size $D^\phi$ of the laser beam at the reflecting face S can be expressed by:

$$D^\phi \cong R \cdot \theta_T \tag{37}$$

so that from eq. (36) and eq. (37)

$$D^\phi \cong R \cdot \frac{\lambda_0}{D} \tag{38}$$

Substituting numerical values (R=50 m, $\lambda_0=0.8$ μm and D=1 mm) in eq. (36) and eq. (38), respectively, $$\theta_T \cong 0.8 \times 10^{-3} \text{[rad.]}$$

and $$D^\phi \cong 0.8 \times 10^{-3} \text{[rad.]} \times 50\text{[m]} = 4.0 \text{[cm]}$$

As can be seen from these values, the diameter, that is, the spot size of the laser beam at the reflecting face of the target which is remote from the laser radar in a distance of 50 m is approximately 4 cm, so that the spot size, in fact, is fully small as compared with the reflecting face S of the target, and thus, the radar equation (35) can be applied to an actual target. Moreover, the propagation loss in air $L_R$ is written as:

$$L_R \cong \exp\{-2(\delta_a+\delta_b)R\} \tag{39}$$

where
$\delta_a$: attenuation coefficient by absorption in air
$\delta_b$: attenuation coefficient by scattering in air.
Experiments show that this propagation loss amounts to at most a value of 50 dB/km in rain. Thus, if the laser radar is subject to operate with a maximum detection or ranging distance $R_{max}=50$ m, no trouble is caused practically by using an approximation of $L_R \cong 1.0$ (0 dB). Therefore, eq. (35) for the range of $R \leq 50$ m may be written as:

$$\frac{P_r}{P_t} \cong K \cdot t_T \cdot t_R \cdot \frac{A_R}{4\pi R^2} \tag{40}$$

While, in FIG. 26 reference numeral 142 designates the receive optical system.

(b) Detection of Light Pulse as received

Figure 27:
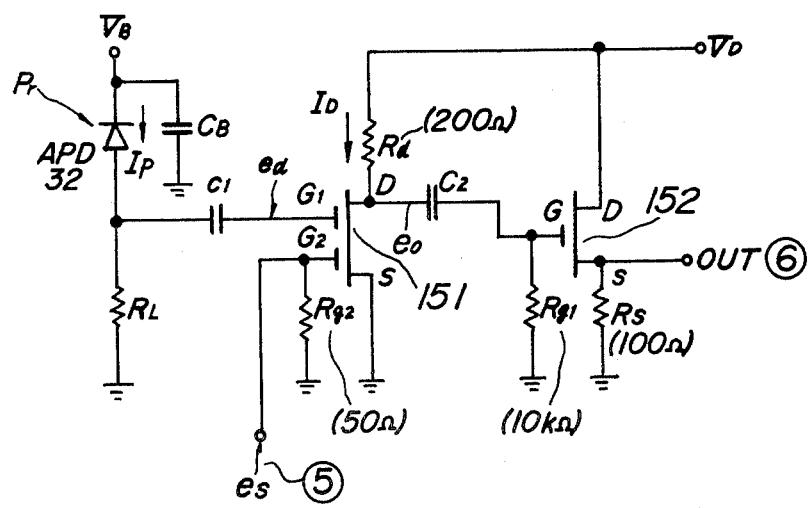
FIG. 27 is a schematic diagram of an embodiment of the photo-detector according to the invention.
Figure 28:
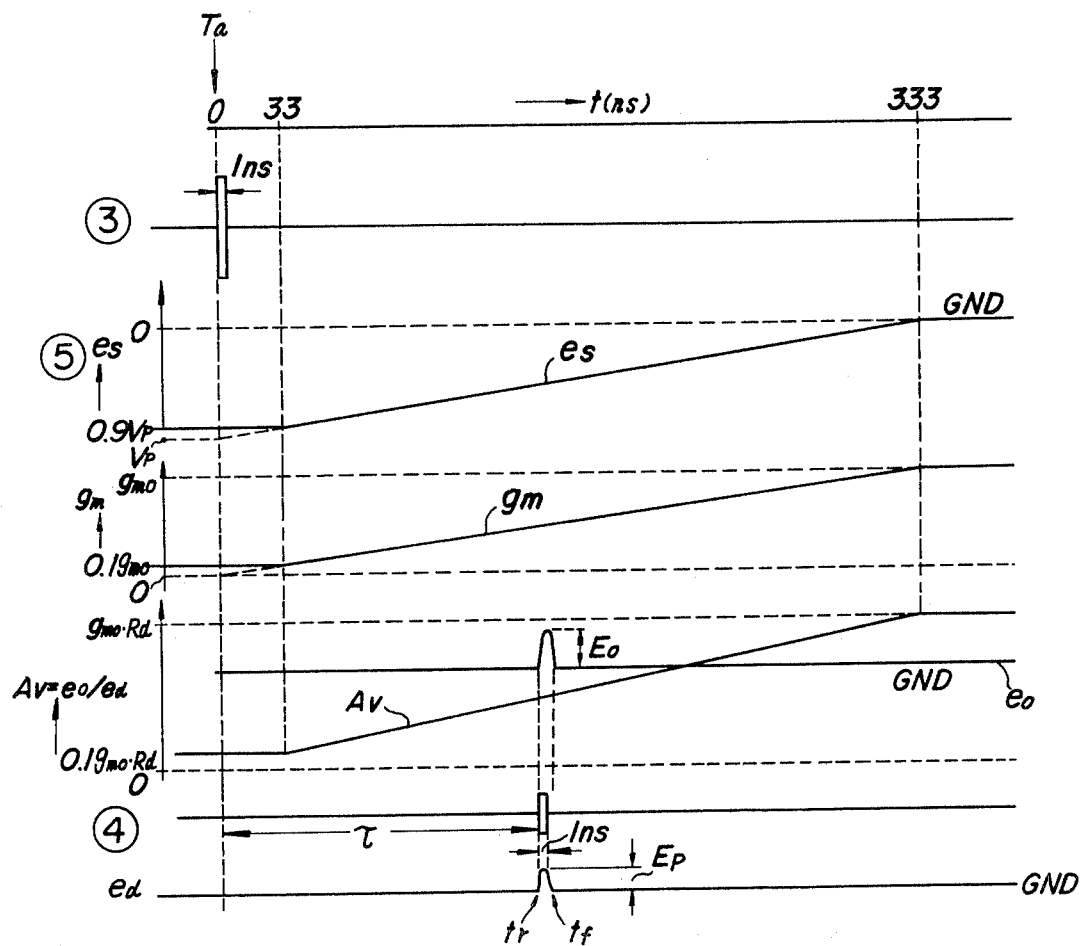
FIG. 28 is a timing chart for FIG. 27.

FIG. 27 illustrates a schematic diagram of an embodiment of a photo-detector according to the invention and FIG. 28 shows a timing chart relevant to FIG. 27. A light which is reflected from a target and focussed by a convex lens is directed onto a light receiving face of an APD (avalanche photo-diode) 32, and is converted photoelectrically into a video pulse signal of high rate $e_d$. To this APD 32 is applied a reverse bias $V_B \cong 100$ V which is near the breakdown voltage of the APD, so that a photocurrent obtained by the incident light is amplified by fifty to one hundred times through the electron avalanche phenomena.

Also, the APD 32 has a good response such that a rise-up time $t_r$ and a fall-down time $t_f$ of the video pulse signal lie in a range of 100–200 psec. In FIG. 27 a dual gate FET (field effect transistor) 151 and an FET 152, together with circuits associated therewith, form the preceding stage having the power amplification factor $P_{pre}$ and a succeeding stage of the variable gain preamplifier 33 as shown in FIG. 8, respectively. The video pulse signal $e_d$ is supplied to a first gate $G_2$ of the FET 151 which has a maximum oscillation frequency $f_{max} > 10$ GHz, and is amplified with a voltage gain $A_v$ dependent upon the level of the STC signal $e_s$ ⑤ applied to a second gate $G_2$ of the FET 151.

Relations between the power of the received light $P_r$ as an input and the photocurrent $I_p$ as an output of the APD are given according to its operational conditions by $I_p \propto P_r^{0.5 \sim 1}$. It is supposed that the APD is caused to operate in a range of $I_p \propto P_r^{0.5}$. Since $E_p \propto I_p \cdot R_L$ is valid for a detection output $E_p$, the peak value $E_p$ of the video pulse signal $e_d$ is written with respect to the power $P_r$ of the received light as follows:

$$E_p \propto \sqrt{P_r} \qquad (41)$$

By substituting eq. (40) in eq. (41) the following equation may be obtained $$E_p \propto \frac{\sqrt{K}}{R} \qquad (42)$$

It is assumed that a pinch-off voltage of the gate $G_2$ of the FET 151 be $V_p(<0)$. With respect to a time axis t having as a reference a time $T_a$ at which the laser pulse of the transmitted light ③ is emitted, the STC signal $e_s$ may be expressed by:

$$e_s = \frac{V_p}{333} \times (333 - t) \qquad (43)$$

where $33[\text{ns}] \leq t \leq 333[\text{ns}]$. Generally, relations between the gate voltage $V_g$ and the transconductance $g_m$ of the FET 151 may be given by:

$$\frac{g_m}{g_{m0}} \simeq 1 - \frac{V_g}{V_p} \qquad (44)$$

where $g_{m0}$ is transconductance for $V_g=0$. Eq. (44) may be shown as in a graph of FIG. 29. If $V_g$ is replaced by $e_s$ from eq. (43) and eq. (44) the following equation is derived:

$$g_m \simeq g_{m0} \cdot \frac{t}{333} \qquad (45)$$

where $33[\text{ns}] \leq t \leq 333[\text{ns}]$. If a drain resistance is designated by $R_d$, a voltage amplification degree $A_v$ of the FET 151 is given by:

$$A_v = g_m \cdot R_d \qquad (46)$$

Therefore, the voltage amplification degree $A_v$ may be expressed as a function of time by:

$$A_v \simeq g_{m0} \cdot R_d \times \frac{t[\text{ns}]}{333} \qquad (47)$$

The video pulse signal $e_d$ is amplified by the FET 151 to appear as a video pulse signal $e_0$ having a pulse peak value $E_0$. By replacing the term t in eq. (47) by the propagation delay time $\tau$ this pulse peak value $E_0$ of the video pulse signal $e_0$ may be written as:

$$E_0 \simeq A_v \cdot E_p \simeq g_{m0} \cdot R_d \cdot \frac{\tau}{333} \cdot E_p \qquad (48)$$

Substituting eq. (42) in eq. (48) leads to $$E_0 \propto g_{m0} \cdot R_d \cdot \sqrt{K} \cdot \frac{\tau[\text{ns}]}{333} \cdot \frac{1}{R} \qquad (49)$$

While, the propagation delay time $\tau$ is expressed by:

$$\tau = \frac{2R}{C} = 6.6 \times R[\text{ns}] \qquad (50)$$

where c is the light velocity.

R is a distance represented in units of meters. Therefore, by substituting eq. (50) in eq. (49) the following result is obtained:

$$E_0 \propto g_{m0} \cdot R_d \cdot \sqrt{K} \cdot \frac{6.6 \times R}{333} \times \frac{1}{R}$$

Thus, the following equation is derived:

$$E_0 \propto \sqrt{K} \qquad (51)$$

It is apparent from eq. (51) that the pulse peak value $E_0$ of the video pulse signal $e_0$ which is obtained by detecting the light pulse reflected from a target residing in a range of $33[\text{ns}] \leq \tau \leq 333[\text{ns}]$, that is $5[\text{m}] \leq R \leq 50[\text{m}]$ takes values which are determined only by the reflection factor of the target and are irrespective of the distance R to the target when the amplification degree of the pulse peak value is rendered to vary in a manner corresponding to lapse of time t from the instant $T_a$ at which the laser pulse is emitted, that is to say, when the STC (Sensitivity Time Control) is made active.

It should be noted that in case of the APD being activated in a region of $I_p \propto P_r^1$, the pulse peak value $E_0$ can be made independent of the distance R by adding a circuit including said FET 151.

The video pulse signal $e_0$ which has the peak value $E_0$ corresponding to the reflection factor K of the target is sent out as said high-rate video pulse signal ⑥ with an output impedance $Z_0 \simeq 50$ Ω through a source follower circuit for impedance conversion comprising a single gate FET 152 having a maximum oscillation frequency $f_{max} > 10$ GHz. It should be noted that the circuit comprising the FETs 151 and 152 corresponds to the variable gain preamplifier 33 as previously mentioned about. Since the pulse peak value $E_0$ of the high-rate video pulse signal ⑥ from the output of the variable gain preamplifier 33 of the photodetector 31 is determined by the reflection factor K and irrespective of the distance R, it is enabled to eliminate spurious or undesired reflections from road surfaces, guard rails for pedestrian, etc. by applying the pulse signal ⑥ to a comparator having a predetermined threshold after further amplification, and thus, probability of erroneous operation of the laser radar can be made very small.

(4) FUNCTIONS OF DECISION AS TO WHETHER A TARGET FORMS AN OBSTACLE (A) Decision of possibility of passing-through in horizontal and vertical directions (Measurement of a distance between obstacles by sweeping the laser beam)

(a) Three-dimensional analysis of laser beam and reflection point P.

Figure 30:
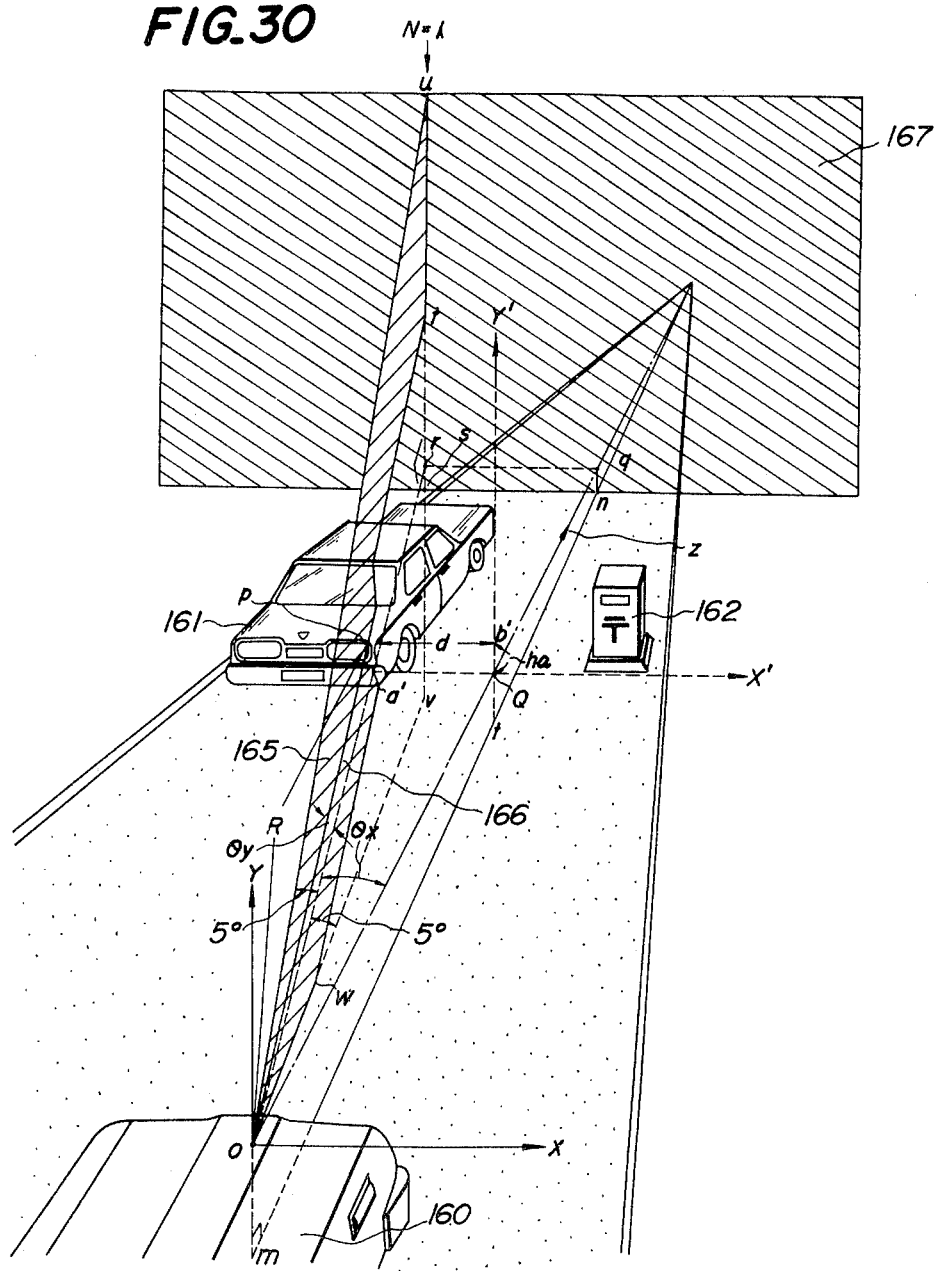
FIG. 30 is a perspective view showing how to detect obstacles by the laser beam according to the invention.

In FIG. 30 reference numeral 160 designates a vehicle onto which a laser radar is mounted, 161 is a target which exists on the left side in the forward running direction of the vehicle 161 (that is, a second vehicle which is parked along the left side of a road), and 162 is a second target which exists on the right side in the forward running direction of the vehicle 160 (that is, a letter box which is placed on the right side of the road).

Three-dimensional coordinates X, Y, Z are defined by assigning "O" to a transmitting point of a laser beam 166 (a light source) and "Z-axis" to a central axis of the vehicle. Then, the X-Z plane is parallel to the road surface. When an imaginary plane which is perpendicular to the Z-axis and very far from the point O is referred to as a $\gamma$-plane 167, a scanning plane Ouv of the light beam (the laser beam) is formed by a scanning line of the N=ith light beam in terms of points u and v on the $\gamma$-plane, where v is an imaginary point at which the $\gamma$-plane 167 intersects the scanning path of the light beam which is emitted at the maximum deflection angle in the negative direction of the Y-axis and is incident onto the road surface at a point w. If the light beam scans in a range of $$-5° \left( = \frac{-\pi}{36} \right) \leq \theta_y \leq 5° \left( = \frac{\pi}{36} \right),$$

a plane through which the light beam passes is represented by a hatched section 165.

In FIG. 30 w is a point at which the light beam at the deflection angle $\theta_y = -5°$ is incident onto the road and u is a point at which the light beam at $\theta_y = +5°$ is incident onto the $\gamma$-plane 167.

Now, it is supposed that the light beam 166 of the deflection angles $\theta_x$ and $\theta_y$ is reflected by a right-end point P of target 161. Let a plane X'-Y' be a plane including the point P, three-dimensional coordinates (X', Y', Z) is defined so that the plane X'-Y' is parallel to the plane X-Y and X'//X and Y'//Y. If b' is a point at which a line perpendicular to the Y'-axis from the point P intersects the Y'-axis, a' is a point at which a line vertical to the X'-axis from the point P crosses the X'-axis, and a distance between the points O and P is $\overline{OP} = R$, the respective points in FIG. 30 correspond to those in FIG. 15, so that from eq. (22) and eq. (23) the following relations can be derived:

$$\left. \begin{array}{l} \overline{Pb'} = d \cong R \cdot \theta_x \\ \overline{Pa'} = h_a \cong R \cdot \theta_y \end{array} \right\} \quad (52)$$

If m is a point at which a line vertical to the road surface from the light source O intersects the road surface, t is a point at which a line vertical to the road surface from an intersection Q of the X' and Y' axes crosses the road surface, n is a point at which a line vertical to the road surface from a cross point q of the $\gamma$-plane 167 and the Z-axis intersects the road surface, and s is a point at which a line vertical to the road surface from a cross point r of the $\gamma$-plane 167 and an extended line of the light beam at the deflection angle $\theta_y = 0°$ intersects the road surface, $\overline{Om} = \overline{Qt} = \overline{qn} = \overline{rs}$ is held.

Figure 31:
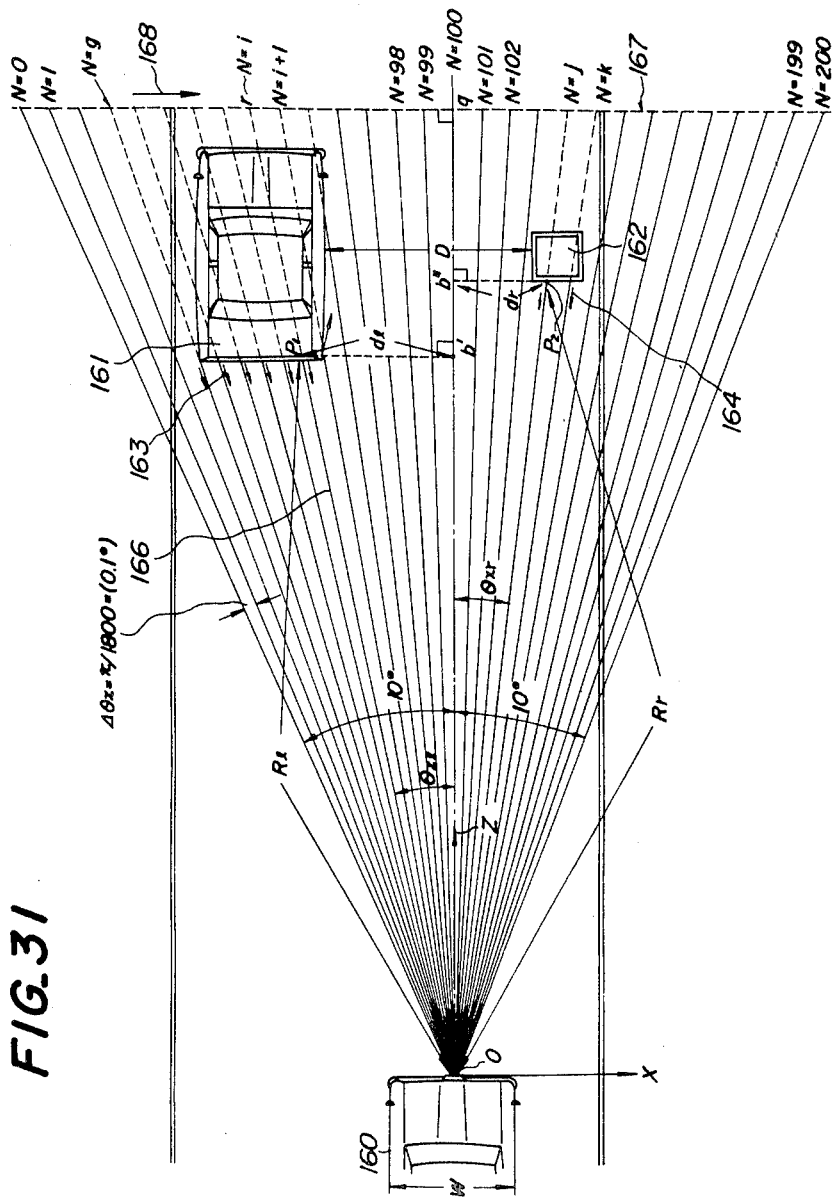
FIG. 31 is a plan view corresponding to FIG. 30.

(b) Measurement of Distance between Two Targets:

FIG. 31 is a diagrammatic illustration of FIG. 30 obtained by viewing it from the upper side of the road surface, that is, in the direction of the Y-axis. The laser beam (the light beam) 166 from the light source O is caused to scan at a spacing between adjacent beams equal to $\Delta\theta_x = 0.1°$ ($= \pi/1800$) from the left to the right as indicated by an arrow 168 in a manner such that a scanning pattern of a sector shape in a range of $$-10° \left( = \frac{-\pi}{18} \right) \leq \theta_x \leq 10° \left( = \frac{\pi}{18} \right),$$

is formed with respect to a central line which coincides with the Z-axis (the central axis of the vehicle). From eq. (32) the light beam is represented by:

$$\theta_x \cong \frac{\pi}{1800} (N - 100), \text{ where } 0 \leq N \leq 200,$$

so that the binary code N (in decimal notation) can be assigned to the respective light beams as shown in FIG. 31.

Now, it is assumed that a reflected light 163 of the light beam corresponding to N=g to N=i can be received from the target 161. A reflected light of the light beam N=i+1 cannot be received because this beam is reflected at a side portion of the vehicle. If $P_1$ is a reflecting point of the light beam N=i occupying the extreme right end of a range over which the reflected light from the target 161 can be received, and a distance between the points O and $P_1$ is $\overline{OP_1} = R_l$, from eq. (52) or eq. (22) a distance from $P_1$ to the Z-axis (the central axis of the vehicle) can be expressed by:

$$\overline{P_1 b'} = d_l \cong R_l \cdot \theta_{xl} \quad (53)$$

Similarly, it is assumed that a reflected light 164 of the light beam N=j to N=k can be received from the target 162. If $P_2$ represents a reflecting point of the light beam N=j located at the extreme left end of a range over which the reflected light of the target 162 can be received, and a distance between the points O and $P_2$ is $\overline{OP_2} = R_r$, from eq. (52) a distance from the point $P_2$ to the central axis of the vehicle (Z-axis) is given by:

$$\overline{P_2 b''} = d_r \cong R_r \theta_{xr} \quad (54)$$

(c) Error in $d_l$ and $d_r$

Now, errors in measurement of the distances $d_l$ and $d_r$ which are given by eq. (53) and eq. (54), respectively, are considered. When the spacing of the adjacent light beams is chosen to $\Delta\theta_x (= \pi/1800 = 0.1°)$, the error in $d_l$ and $d_r$ is given by:

$$\delta = \Delta\theta_x \cdot R_{max} \quad (55)$$

Substituting $R_{max} = 50$[m] in eq. (55)

$$\delta = \frac{\pi}{1800} \times 5000[cm] \cong 8.7 \, [cm] \quad (56)$$

From eq. (54) and eq. (55) a distance D between both the targets is written as:

$$D = d_r + d_l \approx R_r \theta_{xr} + R_l \theta_{xl} \quad (57)$$

By comparing the distance D with the width W of the vehicle 160 decision as to possibility of passing-through between the targets can be done. Accordingly, decision that passing-through is possible is made, that is to say, decision that the targets 161 and 162 are not obstacles is made if the following equation derived by taking into account the error $\delta$ expressed by eq. (56) is valid:

$$W + \Delta W \leq D$$

that is, $$W + \Delta W \leq R_r \theta_{xr} + R_l \theta_{xl} \quad (58)$$

where: $\Delta W \approx 20 [cm]$.

(B) Decision Logic of Passing-Through

Decision logic of passing-through as shown in a flow chart of FIG. 33 will be explained by the aid of FIG. 32.

Figure 32:
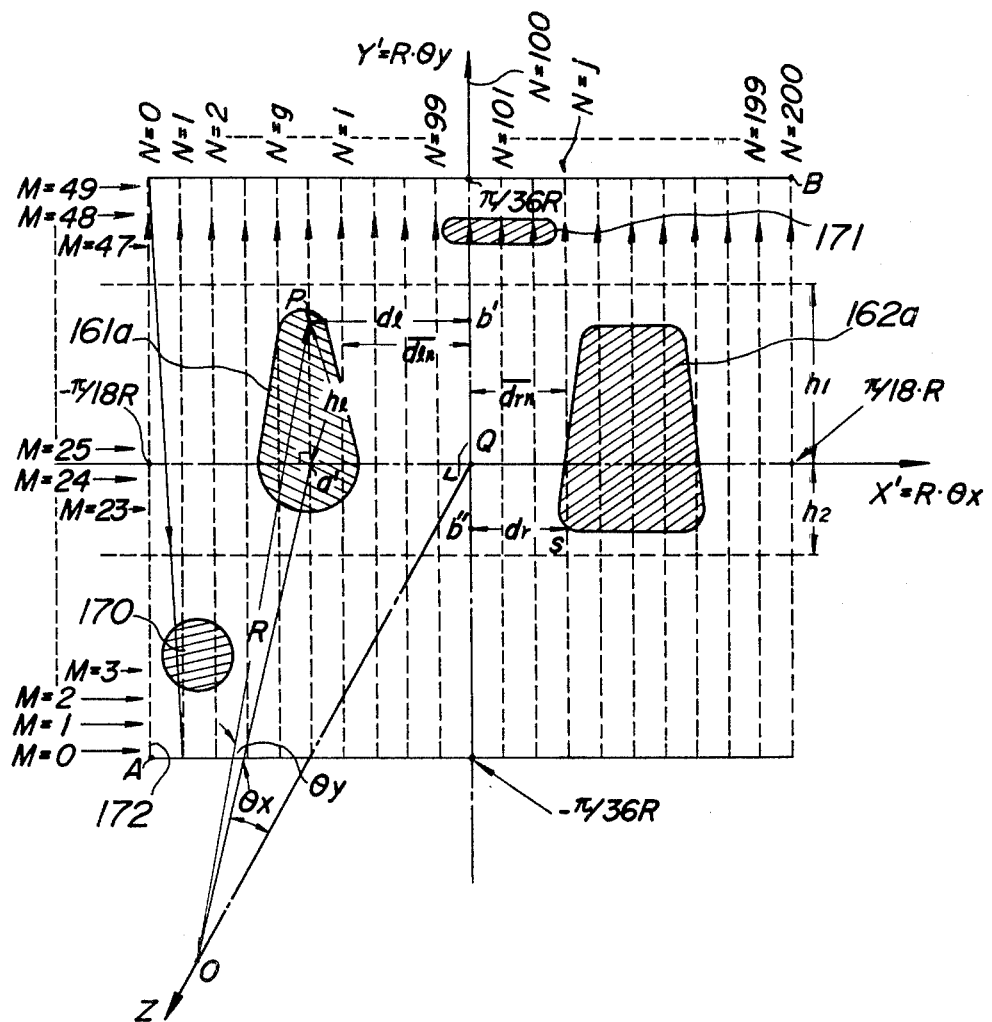
FIG. 32 shows another example of situations wherein various targets exist on a two-dimensional scanning pattern by the laser beam in accordance with the invention.

In FIG. 32 the Z-axis coincides with the central axis of the vehicle, X' and Y' axes intersect the Z-axis at a point Q at the right angle each other, and the X'-Y' plane includes a reflecting point P of a target. It should be noted that in contrast to FIG. 19, FIG. 32 is drawn in a manner such that a broken line 172 represents the path of scanning by the light beam which scans from the point A to the point B with a period of 402 msec., whereas the flyback line is designated by a solid line in order to clearly show various targets.

If R is a distance from the light source O to the target 161a, and $\theta_x$ and $\theta_y$ are deflection angles of the light beam from the Z-axis, respectively, coordinates X' and Y' of the reflecting point P are given by:

$$\left. \begin{array}{l} X' = R \cdot \theta_x \\ Y' = R \cdot \theta_y \end{array} \right\} \quad (59)$$

As seen from eq. (32) and eq. (27), $\theta_x$ and $\theta_y$ can be given by binary codes N and M, respectively, so that a position in the scanning path 172 of the light beam corresponds to sequential combination of the codes N and M as shown in FIG. 32.

In accordance with progress of scanning by the light beam a logical operation defined by the flow chart for decision logic shown in FIG. 33 will be explained below. It should be noted that $P_1$ to $P_{33}$ in FIG. 33 designate respective steps of a program prepared for the decision logic. Upon arithmetic operation utilizing $\theta_x$ and $\theta_y$ in the relevant steps it is supposed that first of all, $\theta_x$ and $\theta_y$ are derived from eq. (32) and eq. (27) by effecting arithmetic operation of $$\left. \begin{array}{l} \theta_x = \frac{\pi}{1800} \times (N - 100) \\ \theta_y = \frac{\pi}{900} \times (M - 25) \end{array} \right\}$$

(I) In case of N < 100

Figure 33:
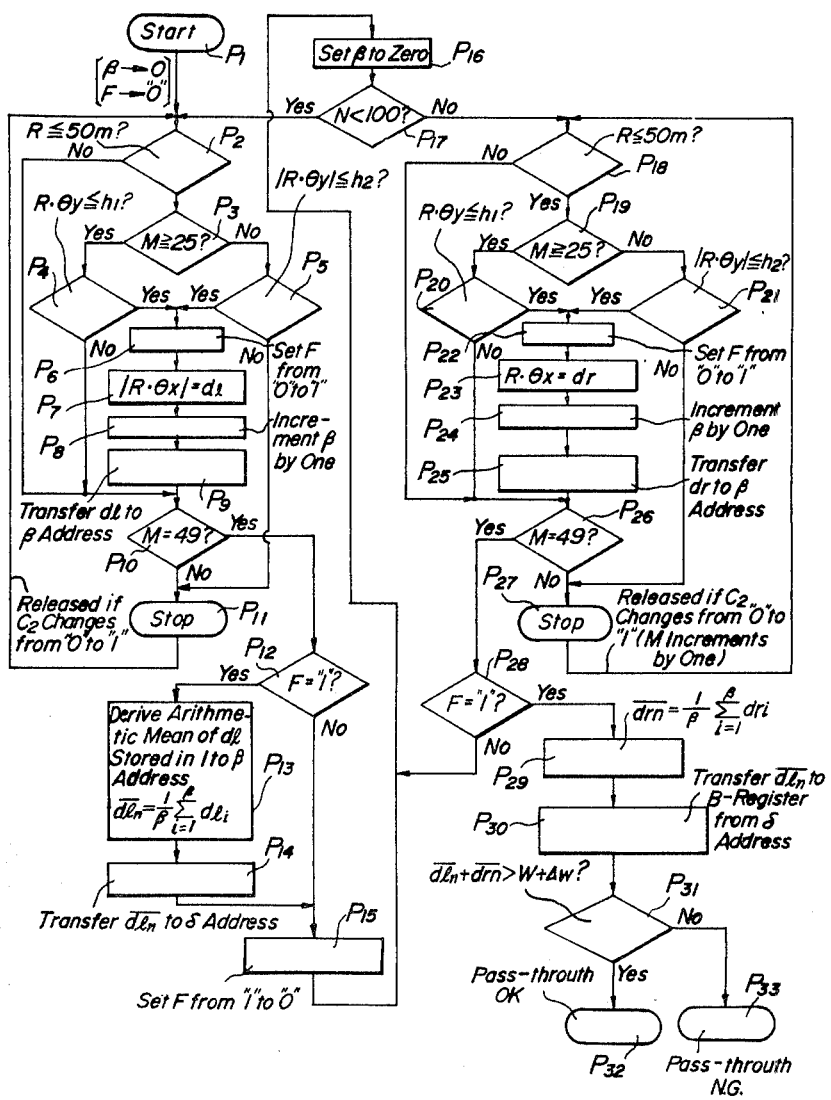
FIG. 33 is a flow chart for decision logic of passing-through in the direction of width of the vehicle according to the invention.

(i) If no target exists in a range of $R \leq 50[m]$:

[1] When the light beam arrives at the point A in FIG. 32, the logical operation starts as indicated by step $P_1$ in FIG. 33 so that an address $\beta$ of the random access memory (RAM) in the microcomputer is set to zero and its flag F to binary "0", respectively. Then, the logical operation reaches directly step $P_{10}$ through step $P_2$.

[2] When the light beam is located at M=0, the logical operation stops at step $P_{11}$ through steps $P_2$ and $P_{10}$. If the clock signal $c_2$ ⑫ (FIG. 18) changes from level "0" to level "1", that is to say, the value of M changes from zero to one, the operation goes back to step $P_2$.

[3] In this manner the logical operation circulates in a loop of steps $P_2$, $P_{10}$ and $P_{11}$ until the light beam reaches a scanning point of N=0 and M=49.

[4] When M=49, the operation is directed to step $P_{12}$ through steps $P_2$ and $P_{10}$. At this time the flag F has been set to "0", and thus, the operation goes to step $P_{17}$ through step $P_{16}$ after passing by step $P_{15}$ and returns to step $P_2$ again.

(ii) When a target 170 exists in the range of $R \leq 50[m]$ but it does not form an obstacle:

[5] If the light beam is shifted to the scanning path for N=1 and no reflected light can be seized for small values of M=0 to 2, the operation circulates through steps $P_2$, $P_{10}$ and $P_{11}$ again.

Figure 34:
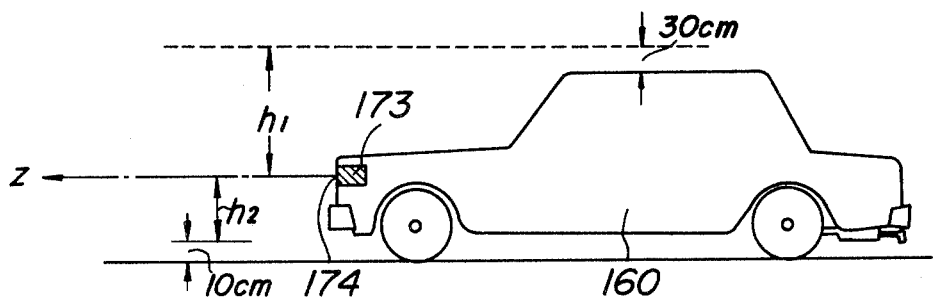
FIG. 34 is an explanatory side view of decision as to possibility of passing-through in the direction of height of the vehicle in accordance with the invention.

[6] If a reflected light from the target 170 is seized at M=3, the operations progress from step $P_2$ via step $P_3$ to step $P_5$ in which comparison of $|R \cdot \theta_y| \leq h_2$ is executed (Note that $h_2$ represents a distance between the central axis of the vehicle 160, namely, the light source 174 of the laser radar 173 mounted on the vehicle 175 and an imaginary plane of at most a height of 10 cm from the road surface as shown in FIG. 34). If the reflected light consists of undesired or spurious reflection of the light beam, or if the target 170 is one which does not prevent running of the vehicle because its height is smaller than or equal to 10 cm from the road surface, the operation reaches step $P_{11}$ from step $P_5$ so as to stop it.

[7] If the level of the clock signal $c_2$ ⑫ (FIG. 18) changes from "0" to "1" and the value of M is incremented by one, the operation returns to step $P_2$. As far as reflection of the light from the target 170 is sustained, the logical operation circulates in a loop of steps $P_2$, $P_3$, $P_5$ and $P_{11}$.

[8] If M is incremented so that no reflection is occured, the logical operation is executed as in the above case [5].

[9] The reflected light from the target 170 is still seized after the light beam is shifted to the scanning path for N=2, and thus, the logical operation is executed as in the above cases [5] to [8].

(iii) When a reflected light of the target 161a existing in the range of $R \leq 50$ m is captured:

[10] If the light beam moves along a scanning path corresponding to N=g, the logical operation is circulated in the loop of steps $P_2$, $P_{10}$ and $P_{11}$ until a reflected light from a target 161a is captured (until the value of M reaches "22" from zero).

[11] If the reflected light from the target 161a is seized for the first time at M=23, the logical operation is executed through steps $P_2$, $P_3$, $P_5$, $P_6$ and $P_7$, wherein at step $P_6$ the flag F is set to "1" from "0" and at step $P_7$ an arithmetic operation of $d_l = \{R \cdot \theta_x\}$ is executed, which corresponds to derive a distance $d_l$ from the reflection point P of the target 161a to the Y'-axis as shown in FIG. 32.

[12] Then, the logical operation is advanced from step $P_7$ via step $P_8$ where the value of $\beta$ is incremented by one, and then, to step $P_9$ at which said distance $d_l$ is transferred to an address 1 of the RAM and stored therein, which will be explained later by referring to FIG. 35. The logical operation is stopped at step $P_{11}$ through step $P_{10}$, and returns to step $P_2$ when the value of M is incremented.

Figure 35:
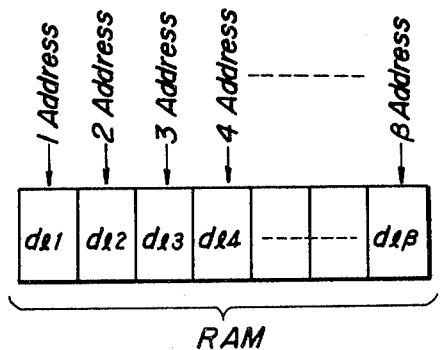
FIG. 35 shows an example of contents to be stored in RAM.

[13] If the reflected light from the target 161a is maintained, the logical operation is circulated for $M<25$ through a loop from $P_2$ via $P_3$, $P_5$, $P_6$, $P_7$, $P_8$, $P_9$, $P_{10}$ and $P_{11}$ back to $P_2$ and for $M \leqq 25$ through a loop from $P_2$ via $P_3$, $P_4$, $P_6$, $P_7$, $P_8$, $P_9$, $P_{10}$ and $P_{11}$ back to $P_2$, so that a value of $d_{l\beta}$ which corresponds to each value of M is stored in succession in the address $\beta$ of the RAM (see FIG. 35).

[14] If the light beam is not reflected from the target 161a upon incrementing of M, the logical operation is circulated through the loop of steps $P_2$, $P_{10}$ and $P_{11}$ up to $M=48$.

[15] At $M=49$ the logical operation is transferred to step $P_{12}$ from step $P_{10}$ and further transferred from step $P_{12}$ to step $P_{13}$ because the flag F has been set to "1". At step $P_{13}$ an arithmetic mean $\overline{d_{ln}}$ of data stored in the addresses 1 to $\beta$ of the RAM is derived as follows:

$$\overline{d_{ln}} = \frac{1}{\beta} \sum_{i=1}^{\beta} d_{li}$$

Subsequently, the logical operation proceeds to step $P_{14}$ at which the value of this $\overline{d_{ln}}$ is stored in an address $\delta$ of the RAM. Then, the logical operation goes to step $P_{15}$ to reset the flag F to "0" from "1", and further to step $P_{16}$ at which $\beta$ is set to zero and finally to step $P_2$ via step $P_{17}$.

[16] Because up to $N=i$ from $N=g$ the reflected light from the target 161a is seized, said processes [10] to [15] are repeated and the contents of $\overline{d_{ln}}$ in the address $\delta$ of the RAM is updated. In the scanning path of the light beam from $N=i+1$ up to $N=99$ any reflection from any targets is not caught, and thus, the value of $\overline{d_{ln}}$ which may be obtained by scanning of the light beam along the scanning path for $N=i$, that is to say, the distance from the extreme right end of the target to the central axis of the vehicle (which corresponds to $d_l$ in FIG. 31) is caused to be stored in the address $\delta$ of the RAM. It should be noted that in the scanning path for $N=i+1$ to $N=99$ any targets do not exist in the range of $R \leqq 50$ m, so that operations similar to those described in the previous case (i) are executed.

(II) In case of $N \geqq 100$ (i) When a target 171 exists in the range of $R \leqq 50[m]$ but it does not form an obstacle:

[17] Because there is no obstacle from $M=0$ to $M=46$, the logical operation is caused to circulate a loop of steps $P_{18}$, $P_{26}$, $P_{27}$ and $P_{18}$ from step $P_{17}$.

[18] If $M=47$ is reached and a return laser pulse from the target 171 is detected, the logical operation is shifted from step $P_{18}$ via step $P_{19}$ to step $P_{20}$ in which the arithmetic operation of $R \cdot \theta_y \leqq h_1$ is executed, where $h_1$ designates the distance from the central axis Z of the vehicle to an imaginary plane which is assumed to be 30 cm above the top roof of the vehicle (see FIG. 34). The target 171 is located upwardly beyond $h_1$, and thus, belongs to a target which passes by the top roof of the vehicle (for example, an overbridge, an arcade, electric lines, branches of standing trees, etc.) Consequently, the logical operation returns to step $P_{18}$ via steps $P_{26}$ and $P_{27}$ from step $P_{20}$. It should be noted that in FIG. 34 reference numeral 173 shows the laser radar.

[19] As far as the return pulse from the target 171 is detected, the logical operation is circulated in a loop of steps $P_{18}$, $P_{19}$, $P_{20}$, $P_{26}$, $P_{27}$ and $P_{18}$. If no return pulse is detected and $M=49$ is reached, the logical operation is passed by steps $P_{18}$, $P_{26}$ and $P_{28}$, and goes back to steps $P_{16}$, $P_{17}$ and $P_{18}$ to shift to a scanning path for $N=101$.

[20] As far as the return pulse from the target 171 is received ($N=100$ to 102), the processes [17], [18] and [19] mentioned above are repeated.

(ii) When a return pulse from a target 162a in the range of $R \leqq 50$ m is received: It is assumed that a return laser pulse from the target 162a is detected at a scanning path for $N=j$ for the first time.

[21] If no return pulse is detected for smaller values of M ($M=0$ to 21), the logical operation is circulated along the loop of steps $P_{18}$, $P_{26}$, $P_{27}$ and $P_{18}$ in synchronism with incrementing of M.

[22] When a return pulse from the target 162a is detected at $M=22$ for the first time, the logical operation is shifted from step $P_{18}$ to steps $P_{19}$, $P_{21}$ and $P_{22}$ in succession so that the flag F is set to "1" from "0", and then, it proceeds to step $P_{23}$ so that an arithmetic operation of $R \cdot \theta_x = d_r$ is executed to derive a distance $d_r$ from a reflecting point s to the Y'-axis. Then, the logical operation is progressed to step $P_{24}$ by which the value of the address $\beta$ of the RAM is incremented by one, and further, to step $P_{25}$ by which $d_r$ is transferred to the $\beta$ address of the RAM. Then, the logical operation goes back to step $P_{18}$ via steps $P_{26}$ and $P_{27}$.

[23] In case of $M<25$ and the return pulse from the target 162a being detected, the logical operation is circulated in a loop of steps $P_{18}$, $P_{19}$, $P_{21}$, $P_{22}$, $P_{23}$, $P_{24}$, $P_{25}$, $P_{26}$, $P_{27}$ and $P_{18}$. In case of $M \geqq 25$ and the return pulse being detected, the logical operation is circulated via a loop of steps $P_{18}$, $P_{19}$, $P_{20}$, $P_{22}$, $P_{23}$, $P_{24}$, $P_{25}$, $P_{26}$, $P_{27}$ and $P_{18}$, so that values of $d_{r\beta}$ are stored in 1 address to $\beta$ address of the RAM in succession (see FIG. 35).

[24] Up to $M=48$ after no return pulse is detected, the logical operation traces a loop of steps $P_{18}$, $P_{26}$, $P_{27}$ and $P_{18}$.

[25] At $M=49$ the logical operation is shifted to step $P_{28}$ via step $P_{26}$ from step $P_{18}$. The flag F has been set to "1" and hence the logical operation is branched to step $P_{29}$ in which an arithmetic mean of data stored in 1 to $\beta$ addresses of the RAM is calculated:

$$\overline{d_{rn}} = \frac{1}{\beta} \sum_{i=1}^{\beta} d_{ri}$$

[26] The value of $\overline{d_{rn}}$ derived for the scanning path of $N=j$, along which the return pulse from the target 162a is detected for the first time, is a distance from the left end of the target 162a to the central axis (the Z-axis) of the vehicle (which corresponds to $d_r$ in FIG. 31).

[27] Subsequently, the logical operation advances to step P$_{30}$ so as to transfer the value of $\overline{d_{ln}}$ stored in δ address of the RAM to a B-register, and thereafter, to step P$_{31}$ in which the following comparison operation which has the same contents as eq. (58) is effected:

$$\overline{d_{ln}} + \overline{d_{rn}} \geq W + \Delta w \tag{60}$$

where W is the overall width of the vehicle, Δw=17 cm (margin of error in measurement). If eq. (60) is satisfied, the logical operation branches to step P$_{32}$ at which an O.K.d output for passing-through is provided, and on the other hand, if eq. (60) is not satisfied, the logical operation is branched to step P$_{33}$ at which an N.G. output for passing-through is produced.

For a time period during which the light beam is swept from the point A to the point B in FIG. 32, the microcomputer 11 (FIG. 6) operates in a manner such that according to the logic as described in the above processes [1] to [27] it decides whether any target is present or not, calculates the distance between any two targets and/or the height of these targets if they are present, and decides whether passing-through these targets is possible or not.

(C) Decision as to possibility of collision

Figure 36:
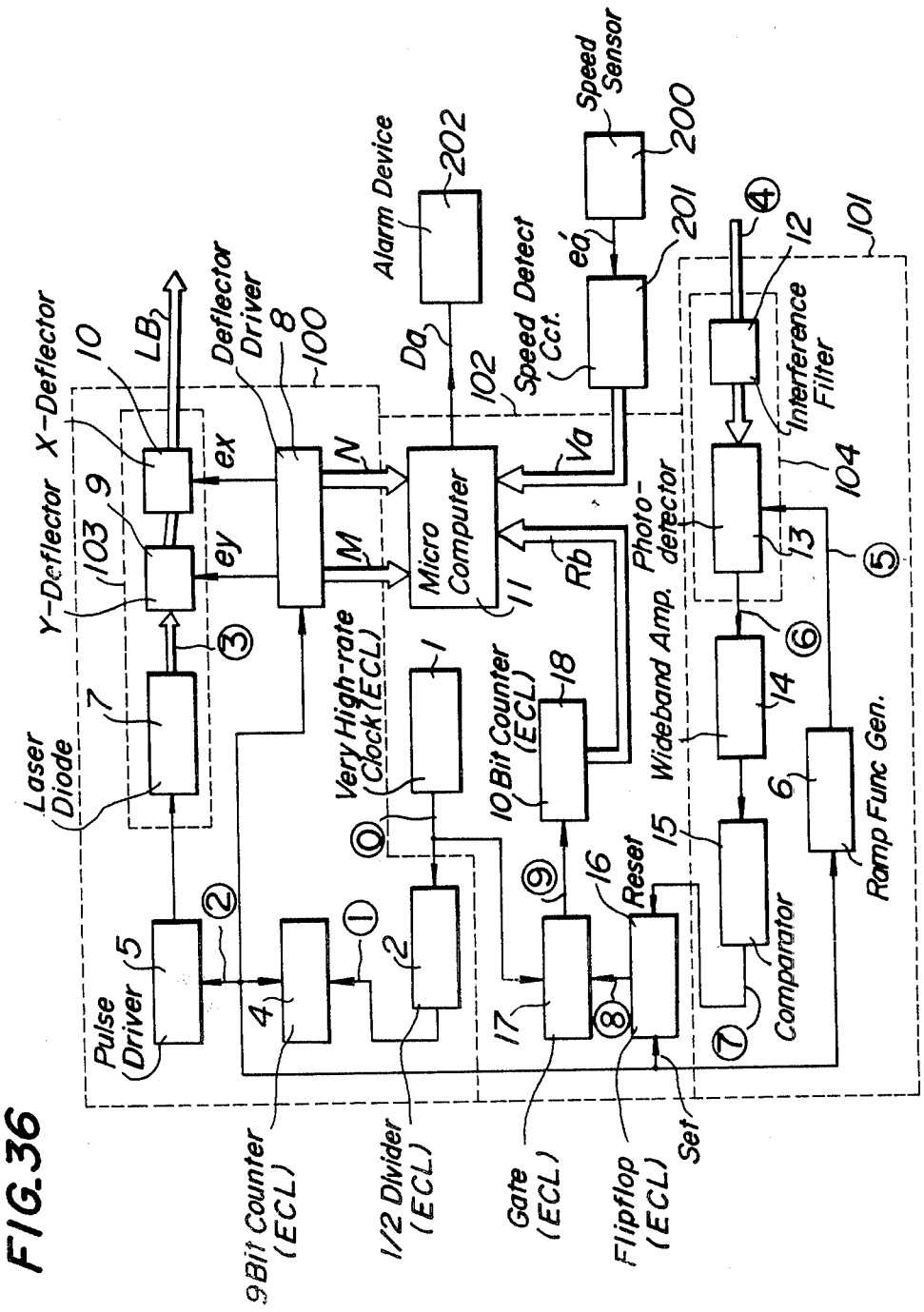
FIG. 36 is a block diagram of another embodiment of the detection system in accordance with the invention.

FIG. 36 shows a block diagram of an embodiment of the invention comprising collision alarm mechanism. In FIG. 36 reference numeral 200 designates a speed sensor of the vehicle, 201 a circuit for detecting the speed of the vehicle and 202 an alarm means, respectively. The remaining numerals in FIG. 36 represent the same components as in FIG. 6.

The speed sensor 200 picks up a vehicle speed V$_a$ and produces a signal in the form of a sequence of pulses e'$_a$ having a pulse frequency proportional to the speed V$_a$. Said sequential pulse signal e$_a$ is fed to the detection circuit 201 of the vehicle speed which is constructed mainly by a counter so that said pulse signal is converted into information V$_a$ of the vehicle speed in a form of an eight-bit parallel binary code (the value of which corresponds to the vehicle speed v$_a$). The information of the vehicle speed is supplied to the microcomputer 11 by which decision about risk with respect to any obstacle is effected. If there is some possibility of collision with any obstacle the microcomputer sends out an alarm signal D$_a$ to the alarm means 202, from which an acoustic alarm is produced to give warning to the driver.

(a) Presence or absence of any obstacle in a course to be traveled by the vehicle.

Figure 37:
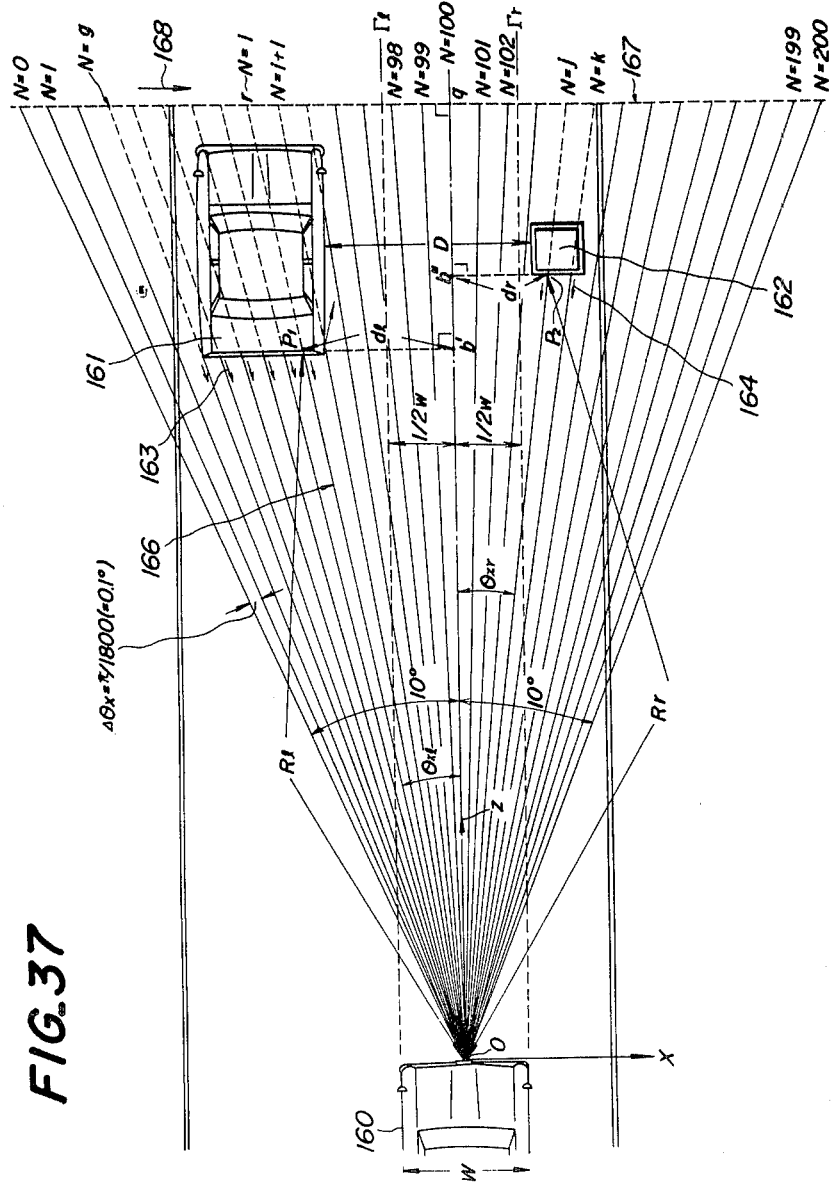
FIG. 37 is a plan view showing an example of a manner of decision as to possibility of collision in accordance with the invention.

By referring to FIG. 37, decision as to possibility of collision is executed in a manner such that decision is made as to whether any obstacle is present or not in a region which is surrounded by an extended plane Γ$_l$ from the leftside face of the vehicle 160 and a further extended plane Γ$_r$ from its rightside face and which is involved within a distance of 50 m from the vehicles, as shown by broken lines in FIG. 37. (In typical street travel the speed of the vehicle is in the order of at most 50 km/hour, so that it is sufficient to watch a distance of up to 50 m ahead of the vehicle even by taking account of delay in response of the driver.) That is to say, a distance d$_l$ from the central axis Z of the vehicle 160 to the rightside face of the obstacle 161 and a distance d$_r$ from the Z-axis to the leftside face of the obstacle 162 are defined by:

$$\left. \begin{array}{l} d_l \leq \frac{1}{2}W + \Delta v \\ d_r \leq \frac{1}{2}W + \Delta v \end{array} \right\} \tag{61}$$

where W is the overall width of the vehicle, Δv is a marginal width for which the vehicle can pass through without making contact with any targets and which is chosen approximately to 50 cm. If eq. (61) is held, the obstacles 161 and/or 162 exist on or near the vehicular course, and thus, there is possibility of collision therewith.

(b) Relations between a stopping distance of the vehicle and a distance to any obstacle from the vehicle.

As previously referred to FIG. 5, if there is any obstacle on or near the vehicular course it is not possible to avoid collision when such an obstacle is located within the stopping distance R$_s$ which must be traveled by the vehicle until it stops by braking operation after visual recognition of the obstacle by the driver. Therefore, it is necessary to produce an alarm for the driver when the obstacle is within the warning distance R$_Q$ which is sum of the stopping distance R$_s$ and a predetermined margin of distance R$_p$.

Referring back to FIG. 5, the stopping distance R$_s$ is given by:

$$R_s = R_1 + R_2 \tag{62}$$

where the free running distance R$_1$ is expressed by:

$$R_1 = v_a \cdot T_d \tag{63}$$

where v$_a$ is the speed of the vehicle and T$_d$ is a time delay of braking operation by the driver; and the braking distance R$_2$ is written as:

$$R_2 = \frac{1}{2\alpha} \cdot v_a^2 \tag{64}$$

where α is deceleration of the vehicle. From eqs. (62), (63) and (64) the stopping distance R$_s$ may be expressed by:

$$R_s = \frac{1}{2\alpha} \cdot v_a^2 + v_a \cdot T_d \tag{65}$$

When the actual distance R$_T$ from the vehicle CA to the obstacle M$_D$ (161 or 162 in FIG. 37) is smaller than or equal to the warning distance R$_Q$, which is the sum of the stopping distance R$_s$ and the predetermined marginal distance R$_p$, that is to say, when such a condition occurs in which from eq. (65) the following relation (66) is valid for R$_T$.

$$R_T \leq R_Q = \frac{1}{2\alpha} \cdot v_a^2 + v_a \cdot T_d + R_p \tag{66}$$

it is needed to produce an alarm for the driver in order to let him know about crisis of collision.

(c) Decision logic for risk of collision by microcomputer

Figure 38A:
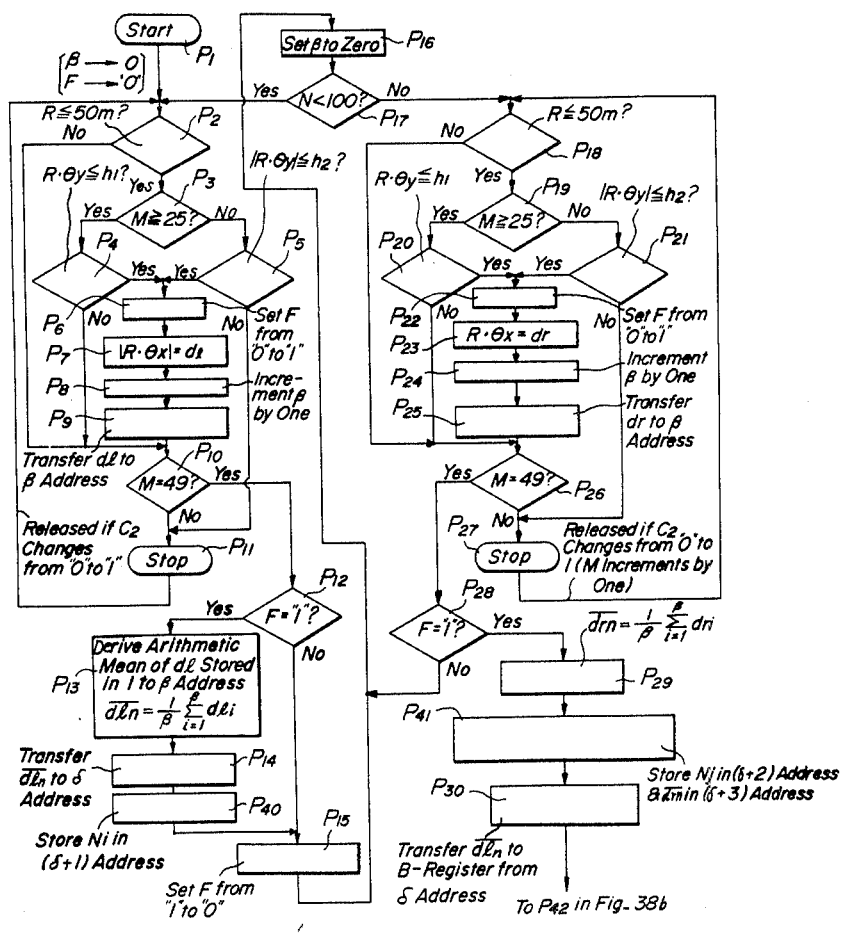
FIGS. 38a and 38b show a flow chart for decision logic as to possibility of collision in accordance with the invention.
Figure 38B:
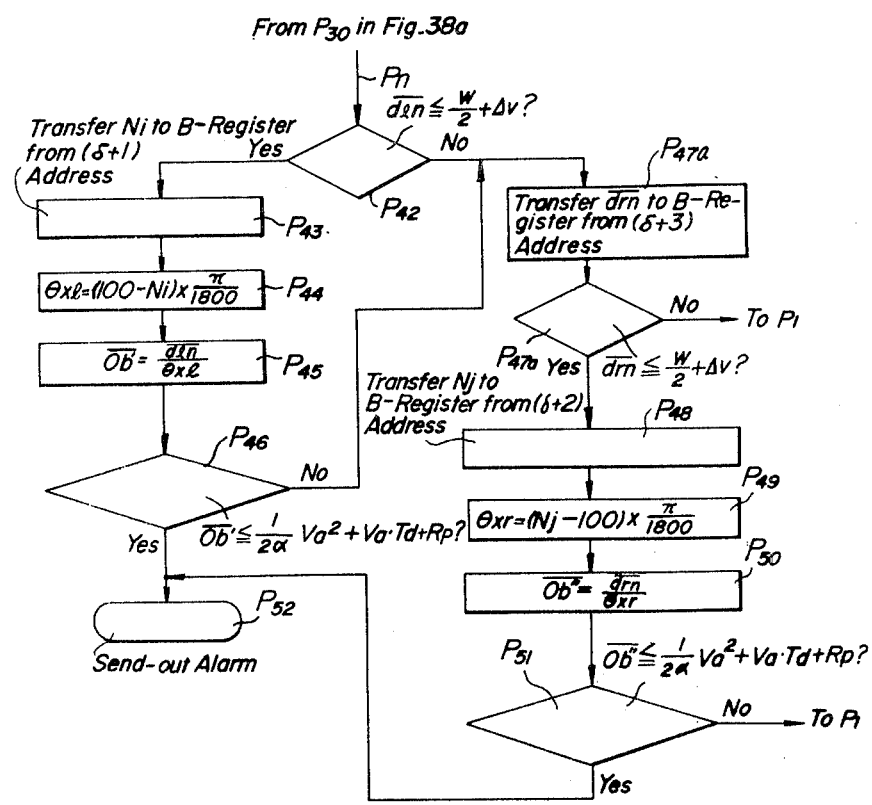

By referring to a second flow chart as shown in both of FIGS. 38a and 38b, decision logic for risk of collision will be explained hereinbelow. Part of the flow chart as shown in FIG. 38a is substantially the same as that shown in FIG. 33, and thus, only the differences of the second flow chart from that in FIG. 33 will be explained. In FIGS. 38a and 38b, $P_{40}$ to $P_{52}$ represent steps included in the program for decision logic as to risk of collision.

[1] At step $P_{14}$ as previously described the averaged distance $\overline{d_{ln}}$ to the central axis Z from the reflecting point $P_1$ at the right end of the obstacle 161 is stored in δ address of the RAM.

At step $P_{40}$, deflection information Ni of the X'-axis for the reflecting point $P_1$ is stored in (δ+1) address of the RAM in order to derive a directional angle $θ_{xl}$ of the reflecting point $P_1$ to the central axis Z at later stages.

Subsequently, as previously described, at step $P_{29}$ the averaged distance $\overline{d_{rn}}$ is derived to the central axis Z from the reflecting point $P_2$ at the left end of the obstacle 162. Then, at step $P_{41}$ this value of $\overline{d_{rn}}$ as derived is stored in (δ+3) address of the RAM, and also, deflection information Nj of the X'-axis for the reflecting point $P_2$ is stored in (δ+2) address of the RAM for deriving a directional angle $θ_{xr}$ of the reflecting point $P_2$ to the central axis Z at later stages. At step $P_{30}$ the value of $\overline{d_{ln}}$ is read out from the RAM and transferred to the B-register. Then, the logical operation advances to step $P_{42}$ as shown in FIG. 38b.

[2] In order to ascertain whether the obstacle 161 exists on or near the vehicular course, decision of $$\overline{d_{ln}} \leq \frac{1}{2} W + \Delta v$$

as defined by eq. (61) is executed at step $P_{42}$. If $\overline{d_{ln}}$ is shorter than or equal to $\frac{1}{2}W+\Delta v$, that is to say, the obstacle 161 is present on or near the vehicular course, the logical operation is branched to step $P_{43}$ at which the deflection information Ni of the X'-axis is read out from (δ+1) address of the RAM and entered into the B-register. Subsequently, at step $P_{44}$ the directional angle $θ_{xl}$ is calculated and at step $P_{45}$ the distance $\overline{Ob'}$ is derived which encompasses to the forward end O of the vehicle from a point b' at which a line perpendicular to the central axis Z from the point $P_1$ intersects the Z-axis. Then, at step $P_{46}$ the distance $\overline{Ob'}$ is checked whether it satisfies eq. (66) in which the speed $v_a$ is replaced by $V_a$ from the speed detecting circuit 201 in FIG. 36, that is to say, decision is made as to whether the obstacle 161 approaches within the warning distance $$\left(R_Q = \frac{V_a^2}{2a} + V_a \cdot T_d + R_p\right)$$

of the vehicle 160. If the distance $\overline{Ob'}$ is larger than the warning distance the logical operation is branched to step $P_{47}$. If the vehicle approaches to the obstacle 161 within the warning distance $R_Q$, the logical operation proceeds to step $P_{52}$ at which a signal indicative of danger is produced.

[3] When the relations as defined at step $P_{46}$ or $P_{42}$ are not satisfied, the logical operation is shifted to step $P_{47}$. At this step, an arithmetic operation as defined by eq. (61) is executed so as to decide whether the obstacle 162 is present on or near the vehicular course. If the obstacle 162 exists on or near the vehicular course, the logical operation proceeds to step $P_{48}$, whereas if not, it returns to step $P_1$.

At step $P_{48}$ the deflection information Nj of the X-axis is read out from (δ+2) address of the RAM into the B-register, and at step $P_{49}$ the deflection angle $θ_{xr}$ of the reflecting point $P_2$ to the central axis Z is derived. Further, at step $P_{50}$ a distance $\overline{Ob''}$ is calculated which extends to the forward end O of the vehicle from a point b'' at which a line perpendicular to the central axis Z from the reflecting point $P_2$ intersects the Z-axis. Then, at step $P_{51}$ eq. (66), in which $V_a$ is substituted for $v_a$, is checked as to whether it is fulfilled or not. That is, decision is made as to whether the obstacle 162 approaches within the warning distance $R_Q$ of the vehicle 160. If the obstacle 162 approaches in the range smaller than or equal to $R_Q$, the logical operation branches to step $P_{52}$ to provide an alarm signal of danger. On the other hand, if the obstacle 162 is distant beyond $Q_R$ from the vehicle, the logical operation goes back to step $P_1$.

[4] As described above it is decided at steps $P_{42}$ and $P_{47}$ whether the obstacles are present on or near the vehicular course. If either or both of the obstacles are really present on the vehicular course, decisions at steps $P_{46}$ and $P_{51}$ are made as to whether the obstacles approach in the range smaller than or equal to the warning distance $R_Q$. When the obstacles appear to approach in said range, an alarm signal of danger is produced to let the driver know about risk of collision.

As fully explained above, many advantages can be obtained by the invention as summarized below.

(1) Heretofore, the decision as to the possibility of passingthrough has been made by way of an eye measurement. However, according to the invention decision of possibility of passingthrough is effected by measuring, remotely from the obstacles, a distance between obstacles on the vehicular course to be traveled by using a laser radar, so that such a decision can be made momentarily and accurately.

Measurement is carried out by emanating a laser light, and thus, a precise decision of possibility on passingthrough can be made in environmental conditions of poor visibility such as at night.

(2) In prior art radio radars a spread angle of the radio beam is at least in the order of 1° (the diameter on the beam spot is about 85 cm at a position having a distance of 50 m from the forward end of the radar). In contrast, in the laser radar a spread angle of a laser beam is less than or equal to 0.057° (the diameter of the beam spot is less than or equal to around 5 cm) and is very sharp in comparison with the radio beam, so that as compared with the radio radar measurement of very high accuracy can be realized.

(3) Applications of the invention may provide apparatus for preventing collision (by which the greater part of accidents caused by rear end collision, which amounts to approximately 22% of traffic accidents between vehicles (the total number of the latter accidents having been 102,447 in 1976), may be considered to be prevented). Particularly, according to the invention the size of an obstacle and its direction to the vehicle can be detected. Accordingly, even on a curved road where errors in operation of the prior art radio radar are liable to occur, such errors can be eliminated substantially and prevention of collision can be realized in precise manner.

(4) Deflection of the laser beam is effected by means of acousto-optic light deflectors, and thus, as compared with prior art systems using mirrors, the deflection angle of the laser beam can be controlled very precisely, so that the direction of a reflecting point on a target with respect to the vehicle can be measured with a high precision.

(5) At the receive portion of the laser radar an STC (Sensitivity Time Control) is effected so that the level of an electric signal obtained by photoelectrically converting a light reflected from the target is determined only by a reflection factor of the target but irrespective of the distance up to the target, enabling undesired or spurious reflection from the road surface, etc., to be removed and erroneous operation of the laser radar to be prevented.

(6) Directional information ($\theta_x$, $\theta_y$) and distance information (R) of a reflecting point on a target measured by the laser light are processed by a microcomputer so that decision of possibility of passing-through can be made with a high accuracy in a shorter time.

While the invention has been disclosed and claimed with respect to the preferred embodiments thereof, it will be understood by those skilled in the art that various changes in form and details may be made therein without departing from the spirit and scope of the invention.

What is claimed is:

1. In an obstacle detection system for use in vehicles wherein decisions based upon predetermined criteria are made with respect to one or more targets existing on a course to be traveled by the vehicle in a running direction to determine whether said each target constitutes an obstacle, including: central clock means for generating high repetition rate clock pulses; pulse driver means responsive to said clock means for producing a sequence of drive pulses; laser means including a single laser responsive to said pulse drive means for emitting a sequence of laser pulses; light deflector means responsive to said clock means and said laser means for deflecting said each laser pulse in the running direction of the vehicle; transducer means responsive to each laser pulse reflected from the one or more targets for photoelectrically converting said each returned laser pulse into an electric pulse signal; and distance information means responsive to said clock means and said transducer means for producing information on distance up to said each target; the improvement comprising:

means included in said light deflector means for sequentially deflecting each of said laser pulses into a high scan density, two-dimensional scanning pattern in the running direction of the vehicle and also for producing a deflection information pair corresponding to a direction of said each laser pulse as deflected; and arithmetic logic means responsive to said deflection information pair for deriving directional information pair representing a direction of said each target with respect to a point where the laser pulse is transmitted, and further responsive to said directional information pair and said distance information as well as information indicative of the speed of the vehicle for deriving a running safety distance up to each target as well as for deriving a mutual distance between at least two targets and a height of each target to provide decision data on possibilities of (1) collision of the vehicle with each target, (2) passing of the vehicle through a laterally spaced target relative to travel direction of the vehicle, and (3) passing of the vehicle under a target.

2. A detection system as claimed in claim 1, wherein said arithmetic logic means includes means for generating an alarm signal when the distance between said target and the vehicle is determined to be less than or equal to a distance which is the sum of a predetermined marginal distance and a stopping distance, the stopping distance being the sum of a free running distance and a braking distance which are both functions of the speed of the vehicle, respectively; and said mutual distance is derived from averaging a plurality of distances between targets.

3. In an obstacle detection system for use in vehicles wherein decisions based upon predetermined criteria are made with respect to one or more targets existing on a course to be traveled by the vehicle in a running direction to determine whether said each target constitutes an obstacle, including: central clock means for generating high repetition rate clock pulses; pulse driver means responsive to said clock means for producing a sequence of drive pulses; laser means including a single laser responsive to said pulse drive means for emitting a sequence of laser pulses; light deflector means responsive to said clock means and said laser means for deflecting said each laser pulse in the running direction of the vehicle; transducer means responsive to each laser pulse reflected from the one or more targets for photoelectrically converting each said returned laser pulse into an electric pulse signal; and distance information means responsive to said clock means and said transducer means for producing information on distance up to said each target; the improvement comprising:

means included in said light deflector means for sequentially deflecting each of said laser pulses into a high scan density, two-dimensional scanning pattern in the running direction of the vehicle and also for producing a deflection information pair corresponding to a direction of each said laser pulse as deflected;

said transducer means responsive to each reflected laser pulse including:

means for receiving a return laser pulse from an extreme right end of a left side target and means for receiving a return laser pulse from an extreme left end of a right side target; and arithmetic logic means responsive to said deflection information pair for deriving directional information pair representing a direction of each said target with respect to a point where the laser pulse is transmitted, and further responsive to said directional information pair and said distance information as well as information indicative of the speed of the vehicle for deriving a running safety distance up to each target as well as for deriving a mutual distance between at least two targets and a height of each target to provide decision data on possibilities of (1) collision of the vehicle with each target, (2) passing of the vehicle through a laterally spaced target relative to travel direction of the vehicle, and (3) passing of the vehicle under a target;

said arithmetic logic means comprising: means for calculating $R_l$, a distance between said laser on the central axis of the vehicle and the extreme right end of a left side target;

calculating $\theta_{xl}$, an angle at the laser between said central axis and said extreme right end of the left side target;

calculating $R_r$, a distance between said laser and the extreme left end of a right side target;

calculating $\theta_{xr}$, an angle at the laser between said central axis and said extreme left end of the right side target; and means for computing $$R_l \cdot \theta_{xl} + R_r \cdot \theta_{xr}$$

and for determining if $$W + \delta w \geqq R_l \cdot \theta_{xl} + R_r \cdot \theta_{xr}$$

where W is an overall width of the vehicle and δw is a predetermined margin in width;
  the detection system further comprising means for producing an alarm signal when it is determined that the aforementioned relationship holds.

4. A detection system as claimed in claim 1, wherein said arithmetic logic means includes means for providing a decision that passing-through between targets arranged laterally to the direction of width of the vehicle is not possible, including means for calculating the relationships $$\overline{d_{ln}} \leqq \frac{W}{2} + \Delta v$$

and $$\overline{d_{rn}} \leqq \frac{W}{2} + \Delta v$$

where $\overline{d_{ln}}$ is a computed minimum distance between a left-side target and the central axis of the vehicle, $\overline{d_{rn}}$ is an averaged minimum distance between a rightside target and said central axis, W an overall width of the vehicle, and Δv is a predetermined half margin in width,
  the detection system further including means for producing an alarm signal if either of the foregoing relationships holds.

5. A detection system as claimed in claim 1, wherein said arithmetic logic means comprises means for providing a decision that passing of the vehicle under an upper target is not possible, including means for computing the relationship $$h_t + \delta_h \geqq R \cdot \theta_y$$

where $h_t$ is a height between said laser pulse transmitting point and a plane involving the top of the vehicle; δh is a predetermined margin of height in the upward direction; R is a distance between said laser pulse transmitting point and a lower end of the upper target located above the vehicular course, from which end a return laser pulse is received; and $\theta_y$ is an angle between said central axis and said lower end of said upper target to said laser pulse transmitting point,
  the detection system further comprising means for producing an alarm signal if the foregoing relationship holds.

6. A detection system as claimed in claim 5, wherein said arithmetic logic means further comprises means for providing a decision that passing of the vehicle under an upper target is not possible, including means for computing the relationship $$h_u + \delta_g \geqq |R \cdot \theta_y|$$

where $h_u$ is a height which is obtained by a substraction of the ground clearance of the vehicle from the height of said laser pulse transmitting point; $\delta_g$ is a predetermined margin of height between the bottom of the vehicle and the road surface; R is a distance between said laser pulse transmitting point and an upper end of a lower target placed on the vehicular course, from which end a return laser pulse is received; and $\theta_y$ is an angle between said central axis and said upper end of said lower target to said laser pulse transmitting point,
  the detection system further comprising means for producing an alarm signal if the foregoing relationship holds.

7. A detection system as claimed in claim 3, 5, 6 or 2, further comprising sub-clock means responsive to said central clock means for generating sub-clock pulses having a high rate corresponding to a predetermined sub-division of said central clock rate; wherein said light deflector means comprises deflector driver means responsive to said sub-clock pulses, said deflector driver means including first and second variable-frequency oscillators to generate respective output signals whose repetitive periods of variation in frequency are synchronized to each other, and a pair of wideband power amplifiers to amplify said output signal into first and second deflection signals of asymmetrical form corresponding to said deflection information pair, respectively; and first and second light deflectors responsive respectively to said first and second deflection signals for sequentially deflecting said laser pulse into first and second directions substantially orthogonal to each other so that on an imaginary plane ahead of the vehicle and substantially perpendicular to the running direction of the vehicle is provided a two-dimensional scanning pattern having a higher scan density in said first direction such that sequential spots of said laser pulse are partially overlapped with each other in said first direction so as to form a continuous trace of said laser spots in said first direction.

8. A detection system as claimed in claim 7, wherein said deflector driver means comprises a first dividing means having a first dividing factor responsive to said sub-clock means for producing a first local clock pulse train, and deflection signal pair generator means including a pair of deflection signal generator means comprising a sawtooth signal generator means and stepwise signal generator means, respectively, said sawtooth signal generator means being responsive to said first local clock for generating a sawtooth waveform signal of said first local clock rate which is supplied to said first variable-frequency oscillator, and said stepwise signal generator means being responsive to said first local clock for generating a stepwise signal of said first local clock rate which is fed to said second variable-frequency oscillator in synchronism with said sawtooth waveform signal.

9. A detection system as claimed in claim 8, wherein said deflector driver means comprises a second dividing means having a second dividing factor smaller than said first dividing factor for generating a second local clock pulse train of a rate higher than that of said first local clock pulse train, and a first counter responsive to said second local clock pulse train for producing a first binary code which corresponds to a first one of said deflection information pair of the laser pulse in the first direction of the two-dimensional scanning pattern; and wherein said stepwise signal generator means comprises a second counter responsive to said first local clock for generating a second binary code which corresponds to a second one of said deflection information pair of the laser pulse in the second direction of said scanning pattern, and an analog-to-digital converter responsive to said second binary code from said second counter for producing said stepwise signal.

10. A detection system as claimed in claim 9, wherein said first counter of said deflector driver means is started and incremented by said second local clock and reset by said first local clock; and said deflector driver means comprises a digital comparator, one input to which said second binary code is fed and the other input to which a binary code corresponding to a scanning range in the second direction of said scanning pattern is applied as a reference code for comparison, said digital comparator being operative to reset said second counter when its contents are equal to said reference code.

11. A detection system as claimed in claim 10, wherein said first and second variable frequency oscillators comprise a first and a second voltage-controlled oscillator, respectively.

12. A detection system as claimed in claim 9, wherein said first and second light deflectors comprise a first and a second acousto-optic light deflector for deflecting the laser pulse in said first and second directions of said scanning pattern, respectively.

13. A detection system as claimed in claim 2, 4, 5 or 6, further comprising sub-clock means responsive to said central clock means for generating sub-clock pulses having a high rate corresponding to a predetermined sub-division of said central clock rate; wherein said light deflector means comprises deflector driver means responsive to said sub-clock pulses, said deflector driver means including a first and a second variable-frequency oscillator to generate output signals whose repetitive periods of variation in frequency are synchronized to each other, and a pair of wideband power amplifiers to amplify said output signals respectively into a first and a second deflection signal of asymetrical form corresponding to said deflection information pair, respectively, and a first and a second light deflector responsive respectively to said first and second deflection signals for sequentially deflecting said laser pulse into a first and a second direction substantially orthogonal each other so that on an imaginary plane ahead of the vehicle and substantially perpendicular to the running direction of the vehicle is provided a two-dimensional scanning pattern having a higher scan density in said first direction such that sequential spots of said laser pulse are partially overlapped to each other in said first direction so as to form a continuous trace of said laser spots in said first direction.

14. A detection system as claimed in claim 13, wherein said deflector driver means comprises a first dividing means having a first dividing factor responsive to said sub-clock means for producing a first local clock pulse train, and deflection signal pair generator means including a pair of deflection signal generator means comprising a sawtooth signal generator means and stepwise signal generator means, respectively, said sawtooth signal generator means being responsive to said first local clock for generating a sawtooth waveform signal of said first local clock rate, which is supplied to said first variable-frequency oscillator, and said stepwise signal generator means being responsive to said first local clock for generating a stepwise signal of said first local clock rate which is fed to said second variable-frequency oscillator in synchronism with said sawtooth waveform signal.

15. A detection system as claimed in claim 14, wherein said deflector driver means comprises a second dividing means having a second dividing factor smaller than said first dividing factor for generating a second local clock pulse train of a rate higher than that of said first local clock pulse train, and a first counter responsive to said second local clock pulse train for producing a first binary code which corresponds to a first one of said deflection information pair of the laser pulse in the first direction of the two-dimensional scanning pattern; and wherein said stepwise signal generator means comprises a second counter responsive to said first local clock for generating a second binary code which corresponds to a second one of said deflection information pair of the laser pulse in the second direction of said scanning pattern, and an analog-to-digital converter responsive to said second binary code from said second counter for producing said stepwise signal.

16. A detection system as claimed in claim 15, wherein said first counter of said deflector driver means is started and incremented by said second local clock and reset by said first local clock; and said deflector driver means comprises a digital comparator, one input to which said second binary code is fed and the other input to which a binary code corresponding to a scanning range in the second direction of said scanning pattern is applied as a reference code for comparison, said digital comparator being operative to reset said second counter when its contents are equal to said reference code.

17. A detection system as claimed in claim 16, wherein said first and second variable frequency oscillators comprise a first and a second voltage-controlled oscillator, respectively.

18. A detection system as claimed in claim 15, wherein said first and second light deflectors comprise a first and a second acousto-optic light deflector for deflecting the laser pulse in said first and second directions of said scanning pattern, respectively.

19. A detection system as claimed in claim 12, further comprising sub-clock means responsive to said central clock means for generating sub-clock pulses having a high rate corresponding to a predetermined sub-division of said central clock rate; wherein said laser means comprises a semiconductor laser in the form of a laser diode, and said pulse driver means comprises current switching means responsive to said sub-clock pulses and connected to one terminal of said laser diode, said current switching means comprising a parallel arrangement of a first series combination of a first electronic switch and a first constant current source of one polarity and a second series combination of a second switch and a second constant current source of the other polarity, and said first and second electronic switches being switched on in an alternating manner in response to said each sub-clock pulse.

20. A detection system as claimed in claim 19, wherein said first electronic switch is first switched on in response to said each sub-clock pulse for a predetermined first duration to enable a forward current to flow through said laser diode, and immediately after said first duration said second electronic switch is switched on for a predetermined second duration.

21. A detection system as claimed in claim 20, wherein said first and second durations are chosen substantially equal to the duration of said each sub-clock pulse to produce a laser pulse having a much steeper trailing edge and a duration which is substantially equal to that of said each sub-clock pulse.

22. A detection system as claimed in claim 19, wherein said first combination comprises a first emitter coupled logic means and said second combination comprises a second emitter coupled logic means.

23. A detection system as claimed in claim 18, further comprising sub-clock means responsive to said central clock means for generating sub-clock pulses having a high rate corresponding to a predetermined sub-division of said central clock rate; wherein said laser means comprises a semiconductor laser in the form of a laser diode, and said pulse driver means comprises current switching means responsive to said sub-clock pulses and connected to one terminal of said laser diode, said current switching means comprising a parallel arrangement of a first series combination of a first electronic switch and a first constant current source of one polarity and a second series combination of a second switch and a second constant current source of the other polarity, and said first and second electronic switches being switched on in an alternating manner in response to said each sub-clock pulse.

24. A detection system as claimed in claim 23, wherein said first electronic switch is first switched on in response to said each sub-clock pulse for a predetermined first duration to enable a forward current to flow through said laser diode, and immediately after said duration said second electronic switch is switched on for a predetermined second duration.

25. A detection system as claimed in claim 24, wherein said predetermined first and second durations are chosen substantially equal to the duration of said each sub-clock pulse to produce a laser pulse having a much steeper trailing edge and duration which is substantially equal to that of said each sub-clock pulse.

26. A detection system as claimed in claim 23, wherein said first combination comprises a first emitter coupled logic means and said second combination comprises a second emitter coupled logic means.

27. A detection system as claimed in claim 22, wherein said transducer means comprises photo-detector means responsive to said each return laser pulse for generating an electric pulse signal of level which is directly dependent upon the distance between the target and the vehicle; and variable gain amplifier means responsive to said electric pulse signal for amplifying it to a predetermined level irrespective of the distance between the target and the vehicle.

28. A detection system as claimed in claim 27, wherein said photo-detector means comprises a photo diode of electron avalanche type.

29. A detection system as claimed in claim 28, wherein said variable gain amplifier means comprises a two stage amplifier, a preceding stage thereof including a dual gate field effect transistor to a gain control gate of which a sensitivity time control signal is applied and a succeeding stage of said amplifier including a field effect transistor.

30. A detection system as claimed in claim 29, wherein a range of the distance to be measured by scanning operation of the laser pulse is dependent upon the beginning and duration of said sensitivity time control signal.

31. A detection system as claimed in claim 30, wherein said transducer means comprises a ramp function generator responsive to said each sub-clock pulse for generating a ramp signal serving as said sensitivity time control signal.

32. A detection system as claimed in claim 30, wherein said transducer means comprises a wideband amplifier responsive to said electric pulse signal as detected for amplifying its level and threshold means responsive to said amplified electric pulse signal for comparing a level of the latter with a predetermined threshold level of said comparator means.

33. A detection system as claimed in claim 31, wherein said distance information means comprises window-time means which is set by said sub-clock pulse and reset by an output of said threshold means to produce a window time signal, gating means responsive to said window time signal from said window time means for passing said central clock pulses, and distance counter means responsive to said central clock pulses for counting the number thereof as supplied for a duration of said window time signal to produce a binary code representing a distance between the vehicle and the target as scanned.

34. A detection system as claimed in claim 33, wherein said window time means comprises a flipflop.

35. A detection system as claimed in claim 26, wherein said transducer means comprises photo-detector means responsive to said each return laser pulse for generating an electric pulse signal of level which is directly dependent upon the distance between the target and the vehicle; and variable gain amplifier means responsive to said electric pulse signal for amplifying it to a predetermined level irrespective of the distance between the target and the vehicle.

36. A detection system as claimed in claim 35, wherein said photo-detector means comprises a photo diode of electron avalanche type.

37. A detection system as claimed in claim 36, wherein said variable gain amplifier means comprises a two stage amplifier, a preceding stage thereof including a dual gate field effect transistor to a gain control gate of which a sensitivity time control signal is applied and a succeeding stage of said amplifier including a field effect transistor.

38. A detection system as claimed in claim 37, wherein a range of the distance to be measured by scanning operation of the laser pulse is dependent upon the beginning and duration of said sensitivity time control signal.

39. A detection system as claimed in claim 38, wherein said transducer means comprises a ramp function generator responsive to said each sub-clock pulse for generating a ramp signal serving as said sensitivity time control signal.

40. A detection system as claimed in claim 39, wherein said transducer means comprises a wideband amplifier responsive to said electric pulse signal as detected for amplifying its level and threshold means responsive to said amplified electric pulse signal for comparing a level of the latter with a predetermined threshold level of said comparator means.

41. A detection system as claimed in claim 40, wherein said distance information means comprises window-time means which is set by said sub-clock pulse and reset by an output of said threshold means to produce a window time signal, gating means responsive to said window time signal from said window time means for passing said central clock pulses, and distance counter means responsive to said central clock pulses for counting the number thereof as supplied for a duration of said window time signal to produce a binary code representing a distance between the vehicle and the target as scanned.

42. A detection system as claimed in claim 41, wherein said window time means comprises a flipflop.

43. A detection system as claimed in claim 34, wherein upon scanning in a direction from the right to the left said arithmetic logic means operates to derive and store in memory means thereof a distance between said leftside target and said central axis by calculating an arithmetic mean of all distances to central axis obtained during the last scanning period to said leftside target in the first direction of said scanning pattern, and also to derive and store in said memory means a distance between said rightside target and said central axis by calculating an arithmetic mean of all distances obtained during the first scanning period to said rightside target in the first direction of said scanning pattern, and vice versa.

44. A detection system as claimed in claim 43, wherein said arithmetic logic means comprises a microcomputer.

45. A detection system as claimed in claim 44, wherein said central clock means, said sub-clock means, said flipflop, said gating means and said distance counter of said distance information means comprise an emitter coupled logic, respectively.

46. A detection system as claimed in claim 42, wherein upon scanning in a direction from the right to the left said arithmetic logic means operates to derive and store in memory means thereof a distance between said leftside target and said central axis by calculating an arithmetic mean of all distances to central axis obtained during the last scanning period to said leftside target in the first direction of said scanning pattern, and also to derive and store in said memory means a distance between said rightside target and said central axis by calculating an arithmetic mean of all distances obtained during the first scanning period to said rightside target in the first direction of said scanning pattern, and vice versa.

47. A detection system as claimed in claim 46, wherein said arithmetic logic means comprises a microcomputer.

48. A detection system as claimed in claim 47, wherein said central clock means, said sub-clock means, said flipflop, said gating means and said distance counter of said distance information means comprise an emitter coupled logic, respectively.

* * * * *